United States Patent [19]

Gotoh et al.

[11] 4,095,055
[45] June 13, 1978

[54] MULTI-STAGE SWITCHING NETWORK IN A TELECOMMUNICATION SWITCHING SYSTEM

[75] Inventors: Kazuhiko Gotoh, Fuchu; Hiroshi Kawashima, Kodaira; Tsuyoshi Katayama, Hachioji, all of Japan

[73] Assignee: Nippon Telegraph and Telephone Public Corporation, Tokyo, Japan

[21] Appl. No.: 740,822

[22] Filed: Nov. 11, 1976

[30] Foreign Application Priority Data

Nov. 17, 1975 Japan ............................ 50-137952

[51] Int. Cl.² .......................... H04Q 3/42; H04Q 3/52
[52] U.S. Cl. ............................ 179/18 GF; 179/18 EA
[58] Field of Search ............. 179/18 G, 18 E, 18 EA, 179/18 J; 325/4

[56] References Cited

U.S. PATENT DOCUMENTS

| | | | |
|---|---|---|---|
| 3,867,583 | 2/1975 | Dorazio, Jr. et al. | 179/18 E |
| 3,963,872 | 6/1976 | Hagstrom et al. | 179/18 EA |

Primary Examiner—Thomas A. Robinson
Attorney, Agent, or Firm—Flynn & Frishauf

[57] ABSTRACT

A multi-stage switching network in a telecommunication switching system includes a virtual link frame having fixedly closed virtual switches which are inserted according to the switching system size required by the application range of telephone traffic into a specified intermediate stage of the multi-stage switching network to permit the switching network of large or upper size to be degenerated to a switching network with smaller numbers of stages by degeneratively inducing a partial path structure from the path structure of the upper sized switching network having a great traffic capacity. The switching network with smaller numbers of stages can be incremented to a switching network of larger or upper size according to the switching system size. In either case, the multi-stage switching network can be controlled by the same control circuit and the same control program.

3 Claims, 51 Drawing Figures

GRID 2, 6, 10, 14

GRID 3, 7, 11, 15

F I G. 29
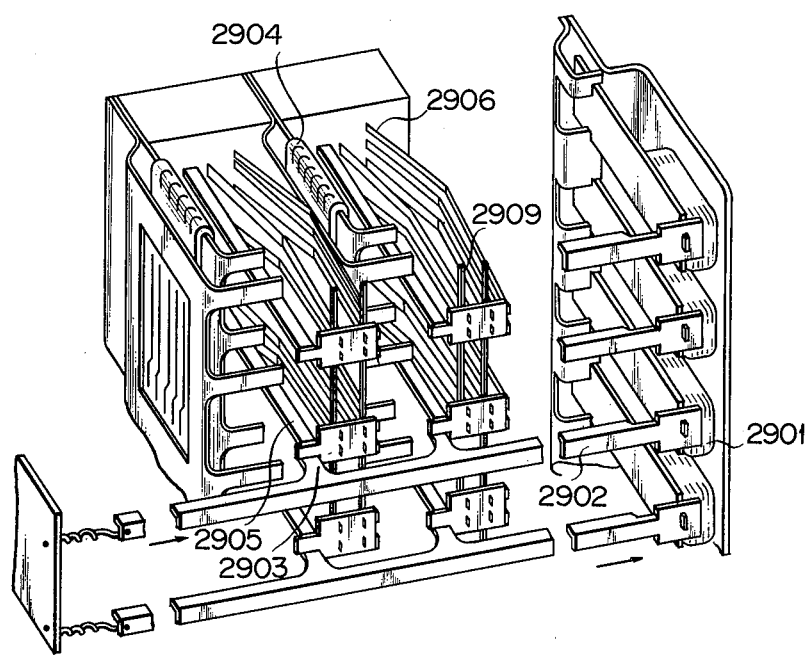

TERMINAL NO.

```
         SCN SIDE    JCN SIDE
           15 o————————o 15
    LSG    14 o————————o 14
           13 o————————o 13
     11    12 o————————o 12
     10    11 o————————o 11
      9    10 o————————o 10
      8     9 o————————o 9
      3     8 o————————o 8
      2     7 o————————o 7
      1     6 o————————o 6
      0     5 o————————o 5
            4 o————————o 4
            3 o————————o 3
            2 o————————o 2
            1 o————————o 1
            0 o————————o 0
                  SLIP 0
```

F I G. 38
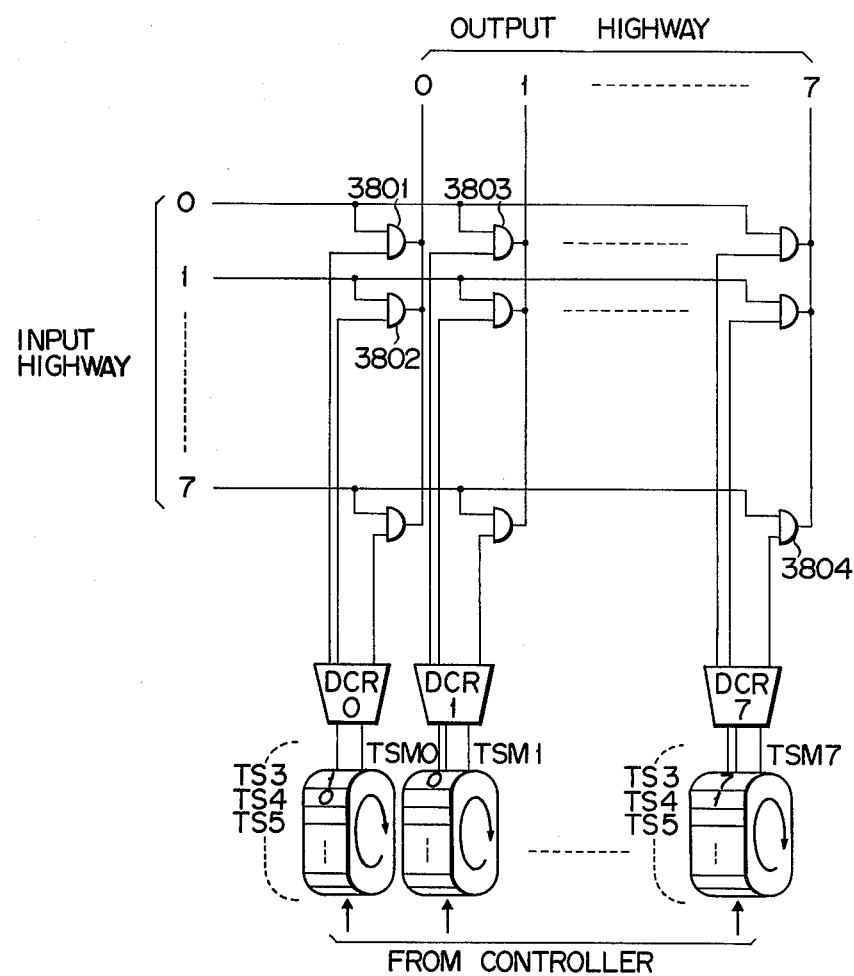

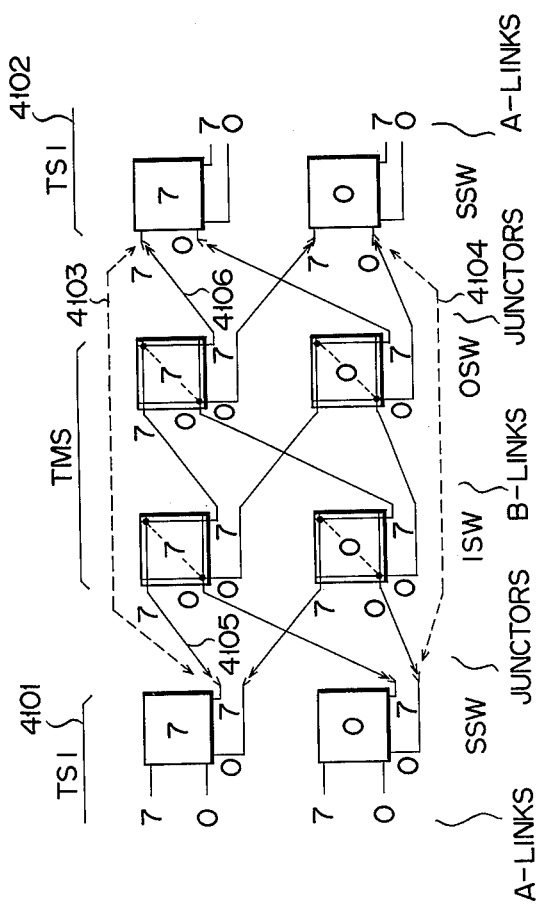
F I G. 41

MULTI-STAGE SWITCHING NETWORK IN A TELECOMMUNICATION SWITCHING SYSTEM

This invention relates to a multi-stage switching network in a common control type switching system which can select any path by a multi-stage link match, and in particular a multi-stage switching network in a common control type switching system which can be degenerated to a switching network of lower size by inserting closed virtual switches into a specified intermediate stage thereof according to the switching system size required by the application range of telephone traffic.

In a block diagram of a shared control type switching system adapted to close any path by a multi-stage link match, for example, a switching network comprises, as shown in FIG. 1, a line link network LLN including a line switch grid LSG and line junctor switch grid LJSG and a trunk link network TLN including a trunk junctor switch grid TJSG and trunk switch grid TSG. The ON-OFF control of switches in the switching network is effected by a control device. The control device comprises a memory means MEM for storing a control program, a central control device CC for controlling the switching network by the control program read out of MEM, a signal receive/distribute device SRD for receiving an output from CC for distribution, a line link network switch control device LSC for supplying an output distributed at SRD to LLN as a control signal, a trunk link network switch control device TSC for feeding the output distributed at SRD to TLN as a control signal, and so on.

In the above-mentioned conventional switching network, for example, the stage size of the switching network and the size of switches or grids are determined according to the switching system size required by the application range of telephone traffic. However, the conventional switching network suffers from the following drawbacks:

(1) It is impossible, from the standpoint of economy, to cover a wide application range using the same switching network of a given size.

(2) If a different stage size is used, the corresponding switching network of the switching system needs to be independently designed. Furthermore, a different path control circuit and different control program are required in this case, making it impossible to replace one switching network with another in the switching system.

(3) When the switching network is incremented to an upper stage size so as to cover a wider application range, such an increment installation is restricted to the increment within the same network stage size of a switching unit. If a stage increment requires a size exceeding an uppermost size, the customary practice is to place another unit corresponding to an increment switching network in side-by-side relation to the existing unit. In comparison with a single unit, an associated trunk circuit and trunks are used for each unit, leading to lowered service efficiency.

(4) In the case of a transportable exchange system, an exchange system can be wholly replaced by an upper sized switching system. In this case, the removed exchange system finds no immediate use and is left as it is. This is disadvantageous from the standpoint of economy.

(5) In a remote control exchange system for collectively controlling a plurality of scattered switching networks, control is effected as a rule by the same control device. If, however, a different stage size is in coexistence, another new control section must be provided to cope with this situation, making it impossible to provide a common control.

It is accordingly the object of this invention to provide a multi-stage switching network in an exchange system which comprises a degenerative type switching network capable of increasing or decreasing a stage size and capable of being controlled by the same control circuit and the same control program.

SUMMARY OF THE INVENTION

According to this invention there is provided a multi-stage switching network in a telecommunication switching system comprising a degenerative type switching network in which a virtual link frame comprised of virtual switches is inserted into any specified intermediate stage of a multi-stage switching network according to the switching system size required by the application range of telephone traffic. The virtual switches are normally closed and are arranged to form fixed crosspoints. This arrangement permits a switching network of lower size to be incremented to an upper sized switching network according to the switching system size required by the application range of telephone traffic.

In either case, the multi-stage switching network can be controlled by the same control circuit and the same control program. It is also possible to control switching networks of varying size at scattered offices by the same control circuit and the same control program.

BRIEF DESCRIPTION OF THE DRAWINGS

FIG. 29 is a diagrammatic, perspective view showing one form of a switch structure;

FIG. 38 shows a time division switch in a switching mechanism different from that shown in FIG. 36;

FIG. 41 shows a small-capacity switching network in which TMS in FIG. 35 is embodied in a virtual form.

DETAILED DESCRIPTION

Figure 1:
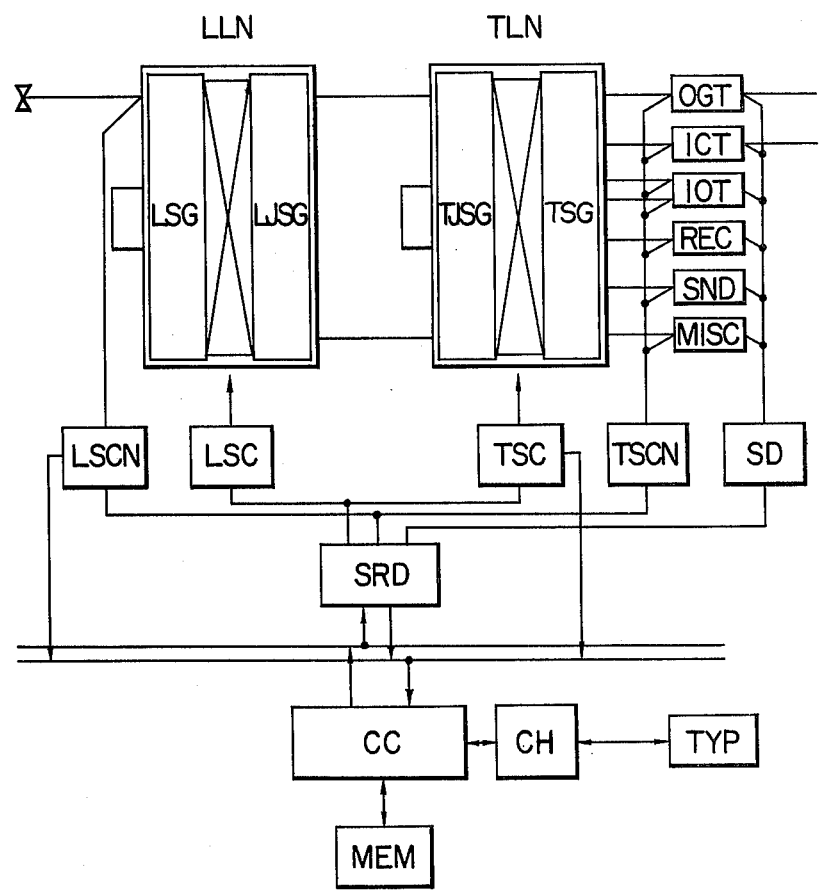
FIG. 1 shows the path structure and control system diagram of a common control type switching system for closing a path by a multi-stage link match.

One embodiment of this invention will be explained below by referring to the drawings.

Figure 2:
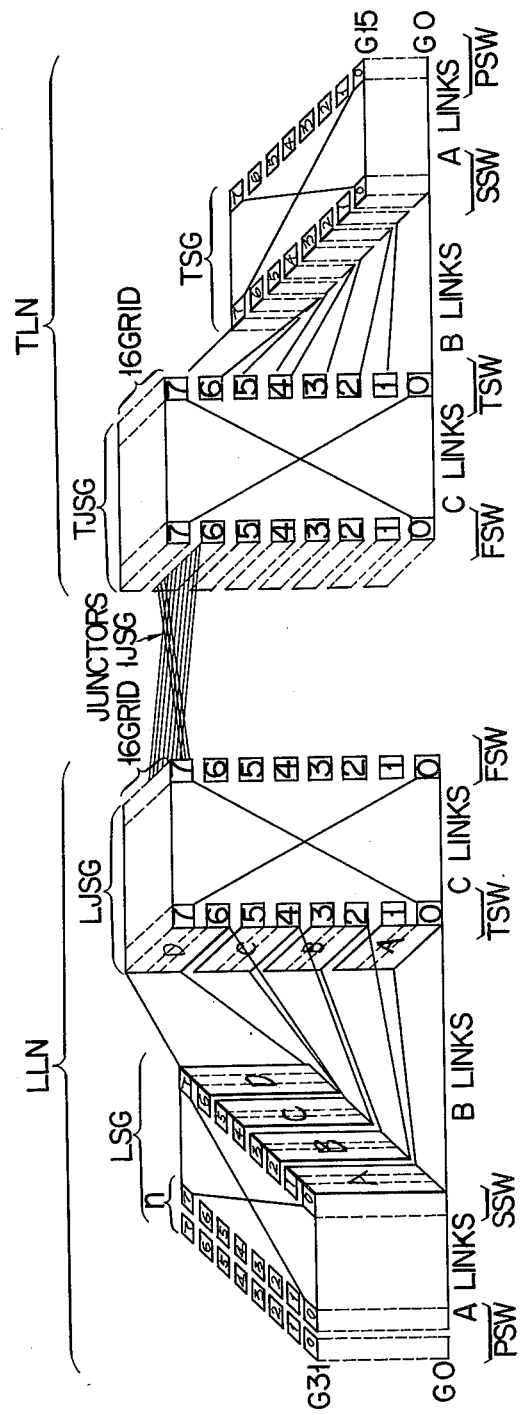
FIG. 2 is a view showing a path structure of a 8-stage arrangement of a multi-stage link type switching network.
Figure 4:
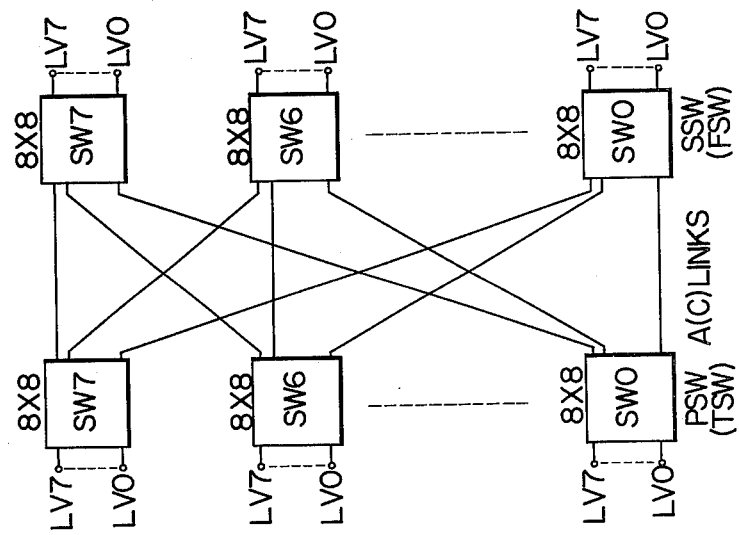
FIG. 4 is a simplified view of FIG. 3.
Figure 3:
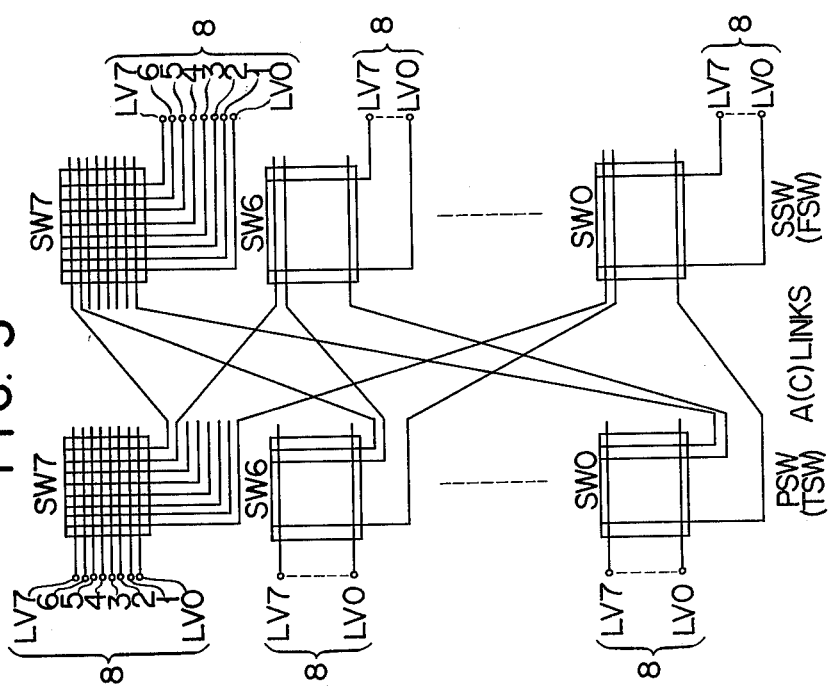
FIG. 3 is a view showing a connection between the terminals of link-connected switches.

FIG. 2 is a diagrammatic view showing a space division type switching network of 8-stage links as one example of a switching network of multi-stage links. As will be later described this invention is not restricted to any specific network and it can be applied equally to a time division type switching network. In FIG. 2, LLN (Line Link Network) is constructed of a line switch grid LSG and a line junctor switch grid LJSG. LSG comprises a primary switch PSW and a secondary switch SSW and LJSG comprises a third switch and a fourth switch. TLN (Trunk Link Network) is constructed of a trunk switch grid TSG and trunk junctor switch grid TJSG. TSG comprises a primary switch PSW and secondary switch SSW and TJSG comprises a third switch TSW and a fourth switch FSW. LSG is constructed by superposing 32 grid plates; LJSG, by superposing 16 grid plates; TSG, by superposing 16 grid plates; and TJSG, by superposing 16 grid plates; each of these grid plates having sixteen 8×8 crossbar switches shown in FIG. 3. The connection relation of switches in each grid plate is shown in FIG. 3. Wires between PSW and SSW are called an A link and wires between TSW and FSW are called a C link. The respective switches in each stage have switch numbers SW0 to SW7 and the terminals of the respective switches have level numbers LV0 to LV7. Terminals LV0 to LV7 at the outlet side of SW7 in PSW are connected through the A link to the corresponding terminals LV7 at the inlet side of SW0 to SW7 in SSW. Likewise, terminals at the outlet side of SW0 to SW6 in PSW are connected through the A link to the corresponding terminals (bearing the level number corresponding to the switch number) at the inlet side of each of SW0 to SW7 in SSW. Such a connection is shown as being simplified in FIG. 4. Wires between SSW and TSW are called a B link and, as shown in FIG. 2, the switches SW0 to SW7 at the outlet side of SSW in LSG are divided into four pairs of groups of terminal areas A(0,1), B(2,3), C(4,5) and D(6,7). Likewise, the switches at the inlet side of TSW which face the terminal areas A, B, C and D in LSG are divided into four pairs of groups of terminal areas A(0,1), B(2,3), C(4,5) and D(6,7). The terminal areas in LSG are connected to the corresponding terminal areas in LJSG. At the output side of SSW in LSG, wires are multiply converged at a ratio of 2:1 between $n$ grids and $(n+16)$ grids where $n=0$ to 15. It is to be noted that, since the B link connected to grids 16 to 31 is similar to the B link connected to grids 0 to 15, the terminals of the terminal areas A, B, C and D at the outlet side of SSW in LSG is equal in number to those of the terminal areas A, B, C and D at the inlet side of TSW in LJSG. As the grid assembly of LSG is multiply wired at the outlet side of SSW the grids 16 to 31 shares the B link connected to grids 0 to 15 and is equivalent to the grids 0 to 15 from the standpoint of a link connection. For this reason, only the grids 0 to 15 will be explained in connection with the link connection. It is to be noted that, unlike the B link of LLN, the B link of TLN is not multiply wired for convergence. A link for connecting together the outlet side terminals of FSW's of LLN and TLN is particularly called a junctor. In a case where a switching network is incremented according to an application range, any selected switches of FSW's of LJSG and TJSG are interconnected in a manner to correspond to their level number and in this way a junctor rewiring is effected for increment. In this case, the A link, B link and C link are used as a fixed wiring with LLN and TLN as an increment unit. Such a rewiring is aimed at obtaining a uniformed traffic between the existing and incremented networks, the detail of which is disclosed in B.S.T.J, vol, XLIII September 1964 No. 5 pp 2435 to 2438 and B.L.R., vol. 44 No. 6 June 1966 pp 193 to 196. The junctor wiring units for rewiring are called as junctor sub-groups. In the embodiment shown in FIG. 2, 16 junctors of grids 0 to 15 each corresponding to the same level number of the same switch number is referred to as one junctor sub-group. In consequence, 8×8(the number of switches × the number of levels)=64 junctor sub-groups are present in a single network.

The terminal numbers of the switching network shown in FIG. 2 can be expressed as follows:

A line Terminal Number LTN showing position numbers in LLN $$= \underbrace{X_{18}X_{17}X_{16}X_{15}X_{14}}_{\text{LLN Number}} \underbrace{X_{13}X_{12}X_{11}}_{\text{PSW Group Number}} \underbrace{X_{10}X_9X_8X_7X_6}_{\text{LSG Number}} \underbrace{X_5X_4X_3}_{\text{PSW Number}} \underbrace{X_2X_1X_0}_{\text{PSW Level Number}} \quad (1)$$

A Junctor Terminal Number JTN showing junctor receiving position number $$= \underbrace{J_3J_2J_1J_0}_{\text{LJSG or TJSG Number}} \underbrace{Y_5Y_4Y_3}_{\text{FSW Number}} \underbrace{Y_2Y_1Y_0}_{\text{FSW Level Number}} \quad (2)$$

Trunk Terminal Number TTN showing position number in TLN $$= \underbrace{Z_{18}Z_{17}Z_{16}Z_{15}Z_{14}}_{\text{TLN Number}} \; 0000 \; \underbrace{Z_9Z_8Z_7Z_6}_{\text{TSG Number}} \underbrace{Z_5Z_4Z_3}_{\text{PSW Number}} \underbrace{Z_2Z_1Z_0}_{\text{PSW Number}} \quad (3)$$

Multiple Group Number MN showing a path number in LLN and TLN are expressed as follows:

$$MN = M_1M_0 \ldots \quad (4)$$

MN will be later described more in detail.

$X_{18}$ to $X_{14}$ in LTN shows an LLN number corresponding to a plurality of LLN's and $Z_{18}$ to $Z_{14}$ in TLN shows a TLN number corresponding to a plurality of TLN's. $X_{13}$ to $X_{11}$ in TLN show a line group number in PSW and correspond to $n$ indicated in FIG. 2. The number in the above-mentioned equations is displayed by a bit number.

Figure 5A:
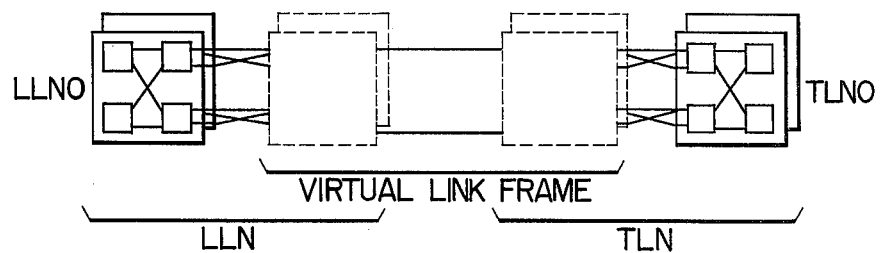
FIGS. 5(A) to 5(C) are views showing 4-stage, 6-stage and 8-stage switching networks, respectively, as applied as a degenerative form.
Figure 5B:
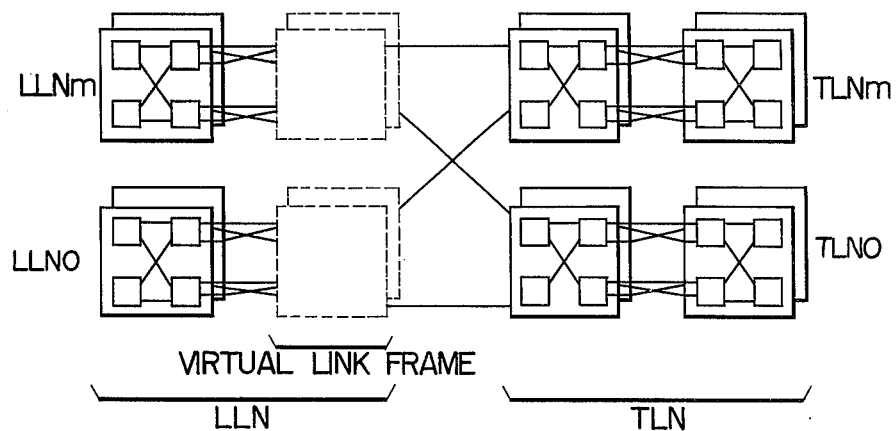
Figure 5C:
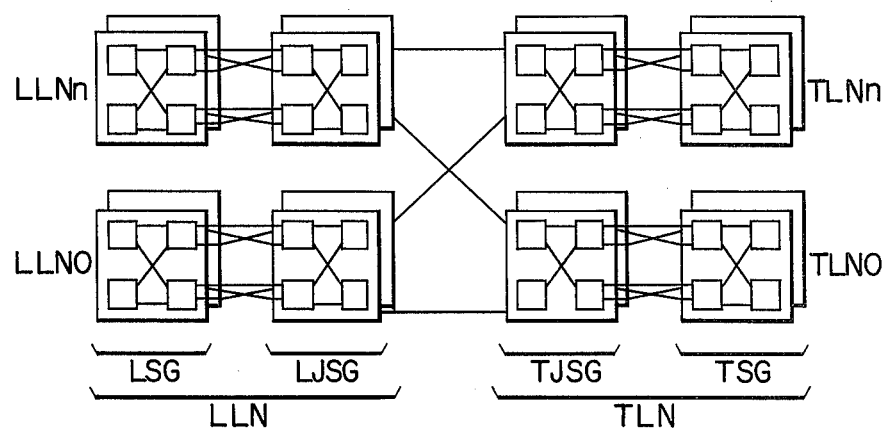

Let us explain a degenerative type 8-stage switching network by referring to FIGS. 5(A) to 5(C).

FIG. 5(C) shows an 8-stage switching network of upper size for a large-scale office, i.e., a switching network having $(n+1)$ LLN's (LLN0 to LLNn) and $(n+1)$ TLN's (TLN0 to TLNn), LLN and TLN constituting an increment unit. A link frame corresponding to a 2-stage portion of LJSG as indicated by a broken line in FIG. 5(B) is removed and instead a virtual link frame comprising virtual switches closed in a fixed manner is inserted to constitute a 6-stage switching network for a medium-scale office. A link frame corresponding to a 4-stage portion of LJSG and TJSG as indicated by a broken line in FIG. 5(B) is removed and instead a virtual link frame is inserted to provide a 4-stage switching network for a small-scale office. The virtual link frame is constructed of virtual switches, but its entity is the above-mentioned junctors.

When the degenerative type 4-stage switching network is used, if a demand is expected for a wider application range, the 4-stage switching network can be incremented to a degenerative type 6-stage switching network by incorporating TJSG into the virtual link frame as shown in FIG. 5(A). If a demand is made for a still wider application range exceeding the maximum capacity of the 6-stage switching network, the 6-stage switching network can be incremented to a 8-stage switching network as shown in FIG. 5(C) by incorporating LJSG into the virtual link frame shown in FIG. 5(B).

The operation of the virtual switches in the virtual link frame used in the above-mentioned degenerative type switching network will now be explained.

Figure 6:
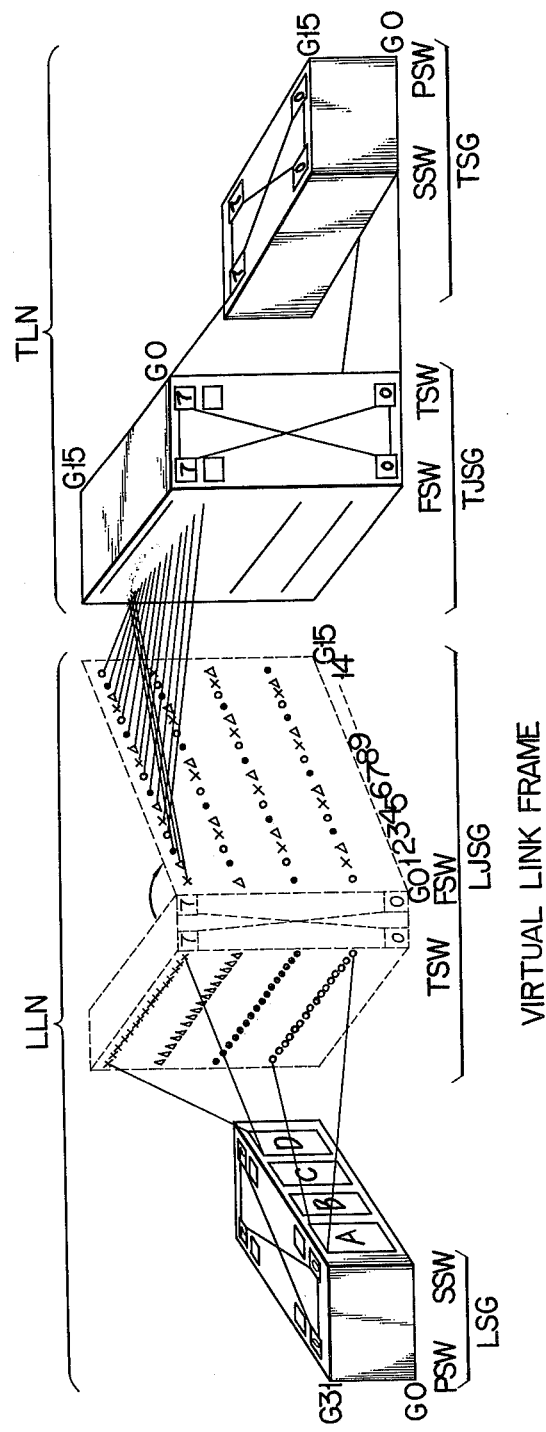
FIG. 6 is a view showing the closure mode of switches in a virtual link frame in the 6-stage switching network in FIG. 5(B)

As mentioned above, the virtual link frame essentially consists of junctors. A specified cross point of the virtual switches constituting the virtual link frame is closed in a fixed manner to establish a path. The path is associated in a one-to-one correspondence with the respective junctor present in the virtual link frame. In consequence, respective paths are equal in number to the junctors and exist without interference. When the degenerative type 6-stage switching network is constructed, a total of 16 junctors (referred to as 1 junctor sub-group) of grids 0 to 15 each corresponding to the same level number of the same switch number is used, like the 8-stage switching network, as a junctor wiring unit in the virtual link frame. The operation of the virtual switches in the virtual link frame will be explained by referring to the degenerative type 6-stage switching network shown in FIG. 6. In FIG. 6, the same reference characters are employed to designate areas, though simplified, corresponding to those shown in FIG. 2. FIG. 6 is a schematic diagram showing paths between 64 terminals at the outlet side of SSW of a single grid plate in LSG and 64 terminals at the outlet side of FSW in LJG using symbols (o, •, Δ, x). The 64 terminals at the outlet side of SSW of the single grid plate in LSG are equally divided according to the B link wiring rule into 4 groups which are present in areas A(0,1), B(2,3), C(4,5) and D(6,7) respectively and represented by symbols (o, •, Δ, x). The 64 terminals at the outlet side of SSW in LSG are connected to terminals at the inlet side of TSW in LJSG. By closing TSW and FSW in LJSG in a fixed manner the 64 terminals at the outlet side of SSW in the single grid plate are drawn as 4 junctor sub-groups toward the outlet side of FSW with the symbols regularly mixed, and are connected to terminals at the inlet side of TJSG in TLN. The paths are generally formed as follows:

(1) The paths are ones extending from K×L terminals at the outlet side of SSW in LSG toward K×L terminals at the outlet side of FSW in LJSG where K represents the number of divided terminal areas of SSW in LSG, i.e., the number of junctor sub-groups and L represents the number of junctors forming the junctor sub-group.

(2) The paths are ones equally extending from L terminals of 1 junctor sub-group toward the outlet side of SSW in LSG.

In this embodiment K=4 and L=16.

Figure 7:
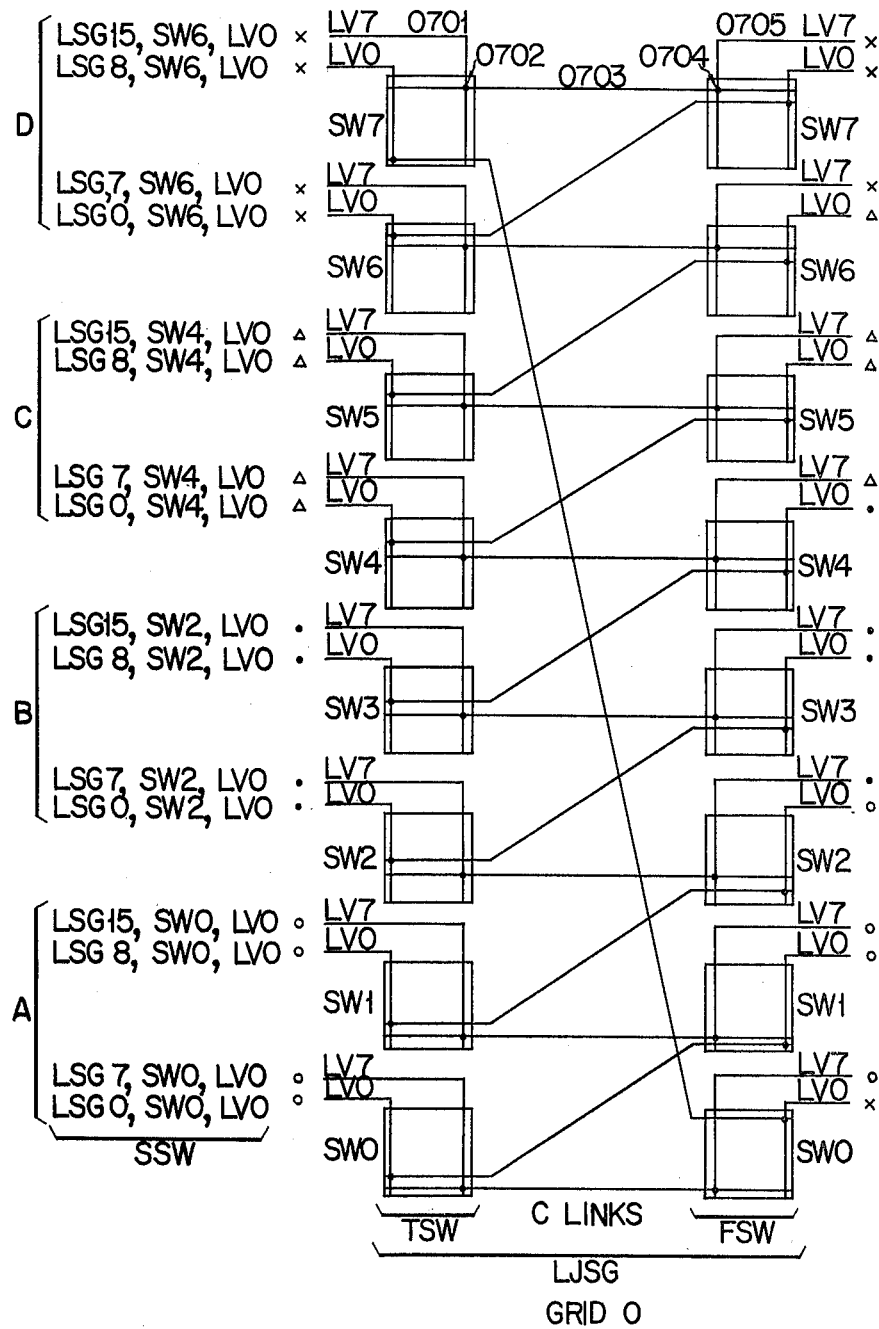
FIG. 7 is a view showing a closure mode of confronting switches in a virtual switch structure.
Figure 8:
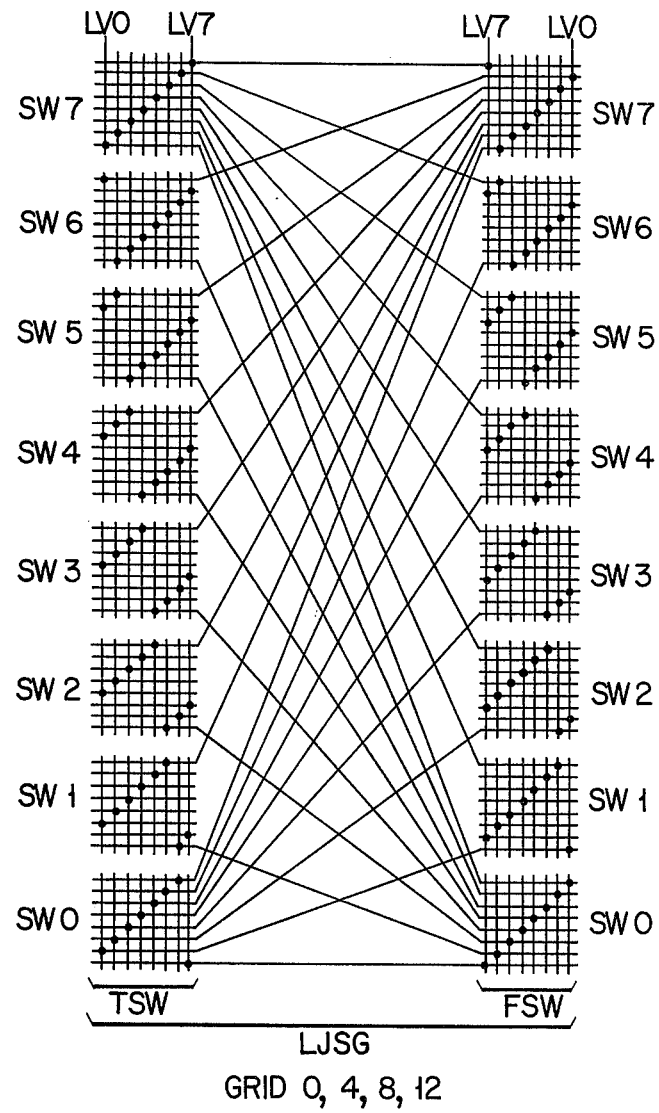
FIGS. 8 to 11 are views each showing a closure mode of cross points of confronting switches in the virtual switch structure.
Figure 9:
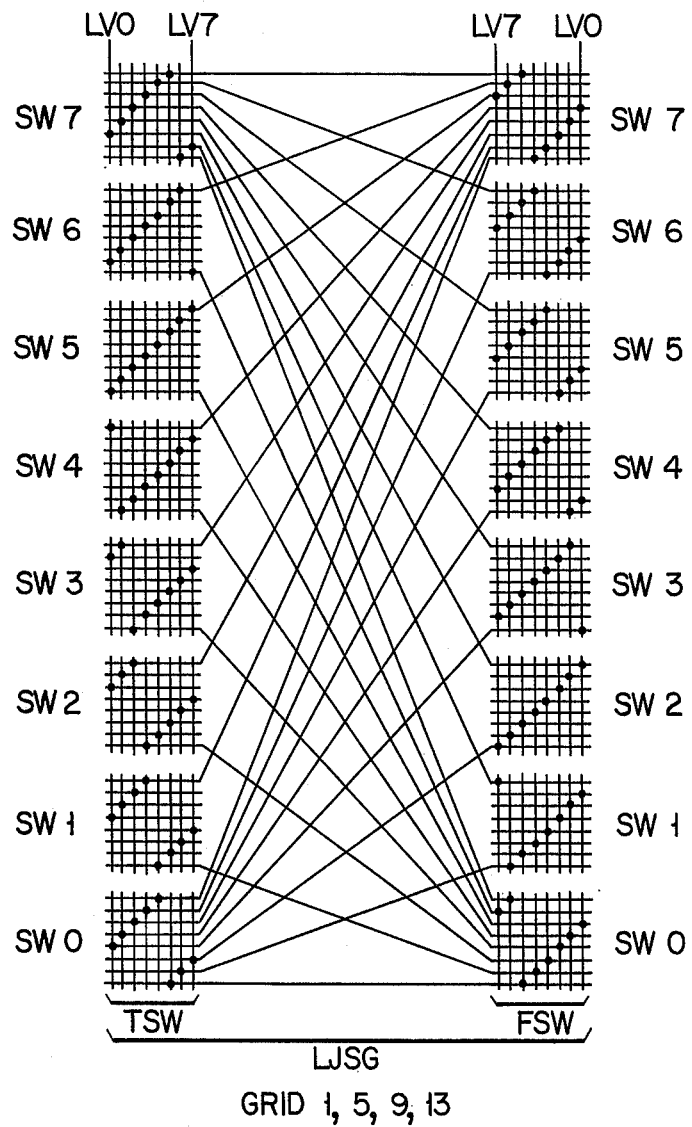
Figure 10:
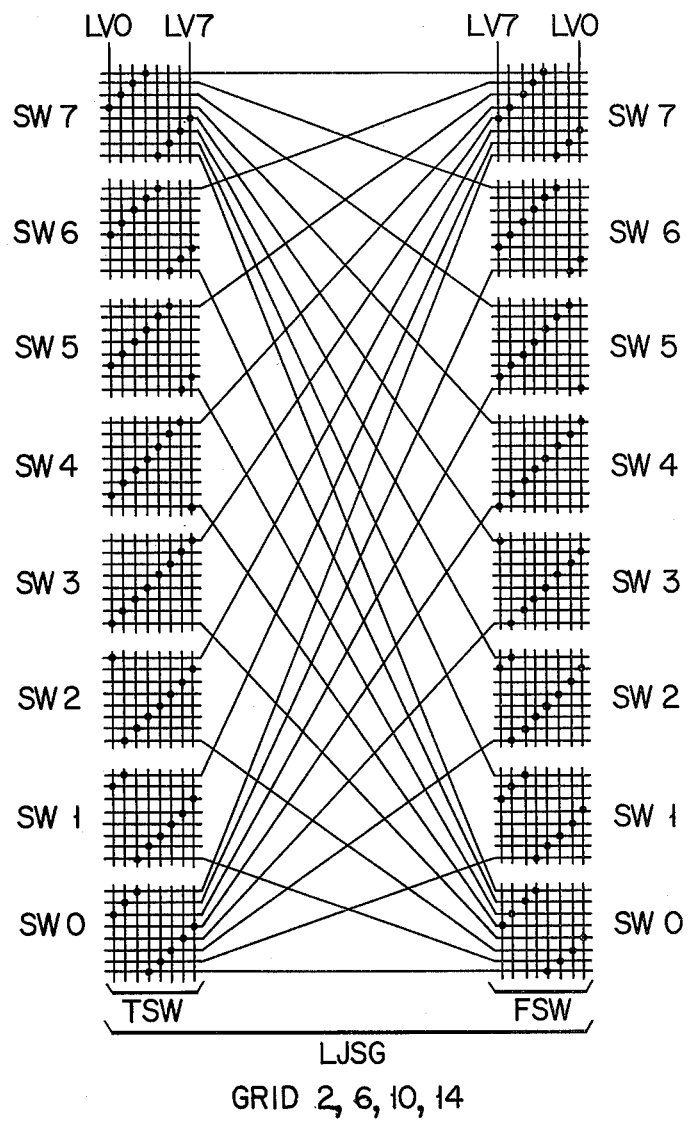
Figure 11:
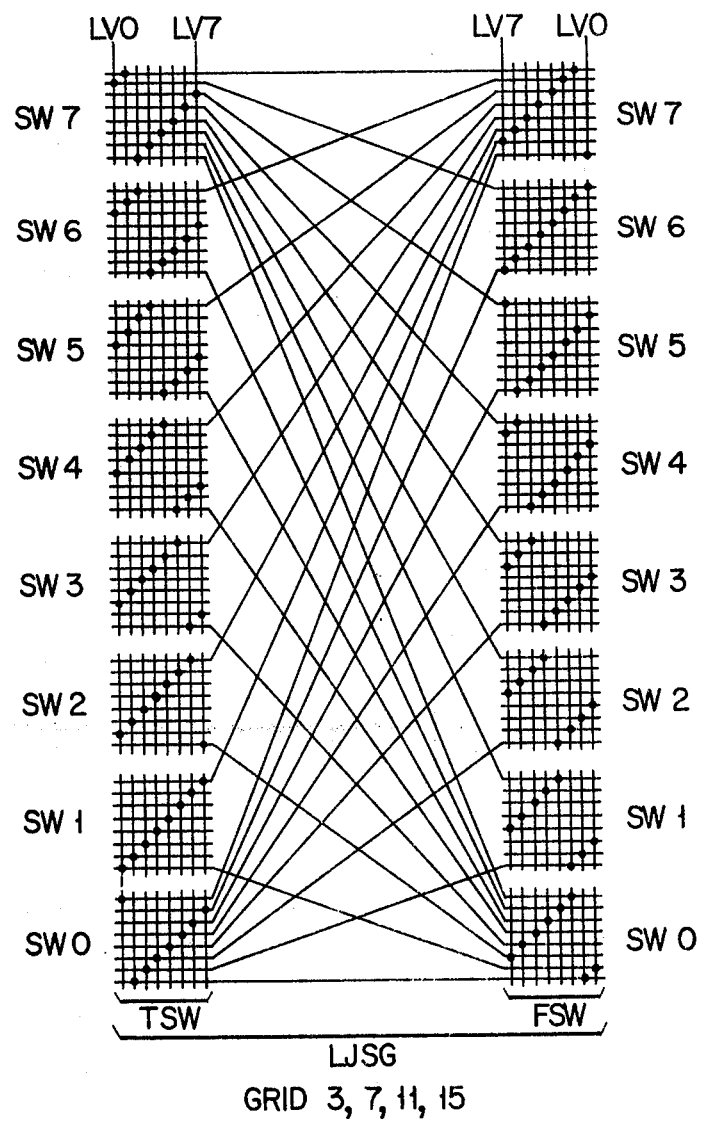

FIG. 7 shows a relation as to which cross point in TSW and FSW is closed, as a virtual switch, in a fixed manner; how TSW and FSW assume a C link arrangement; how a respective cross point of closed switches in TSW is connected to any selected switch of any selected grid; and in what junctor sub-group arrangement a respective cross point of closed switches in LSG is connected to FSW in TJSG. For example, a B link extending from LV0 of SW6 of a grid 15 in LSG is connected to LV7 (0701) at the inlet side of SW7 in TSW. LV7 (0701) is connected through a cross point of closed switches in TSW and through a C link (0703) to LV7 at the inlet side of SW7 in FSW. A cross point (0704) of closed switches in FSW is connected to a junctor (0705) to provide a path for the virtual switch. The path corresponds to one existent junctor in the degenerative type 6-stage switching network. The connection of the other switches, though shown in FIG. 7, is omitted for simplicity. FIGS. 8 to 11 show the position of cross points of closed switches of the respective grids in LJSG. In grids 0, 4, 8, 12 the position of the cross points of switches to be closed are equal for each grid plate as shown in FIG. 8. In grids 1, 5, 9, 13, grids 2, 6, 10, 14, and grids 3, 7, 11, 15 the position of the cross points of switches to be closed are equal for each grid plate, as respectively shown in FIGS. 9, 10 and 11. If, for example, the path is provided by closing a virtual switch instead of an existing junctor in the 6-stage switching network, it is possible to provide a junctor sub-group, like the 8-stage switching network, by connecting terminals at the outlet side of FSW in LJSG to FSW in TJSG. In the 8-stage switching network, junctor sub-groups received by PSW in a single sheet of LSG and available by subscribers are restricted as shown in FIG. 6 to specified four sub-junctors. In this way, a path is provided for fixedly closing a specified cross point of virtual switches TSW and FSW in LTSG instead of using existing junctors in the 6-stage switching network.

The provision of such a path is to control the 6-stage switching network by means of a control circuit and control program of the 8-stage switching network (this can be regarded as if a virtual link frame of the 6-stage switching network were existent) and to permit the 6-stage switching network to be incremented to an 8-stage switching network by inserting the existing link frame into a virtual link frame.

The closure mode of the above-mentioned virtual switch can be applied to the 4-stage switching network. The selection of paths in a degenerative type switching network will be explained below.

Figure 12:
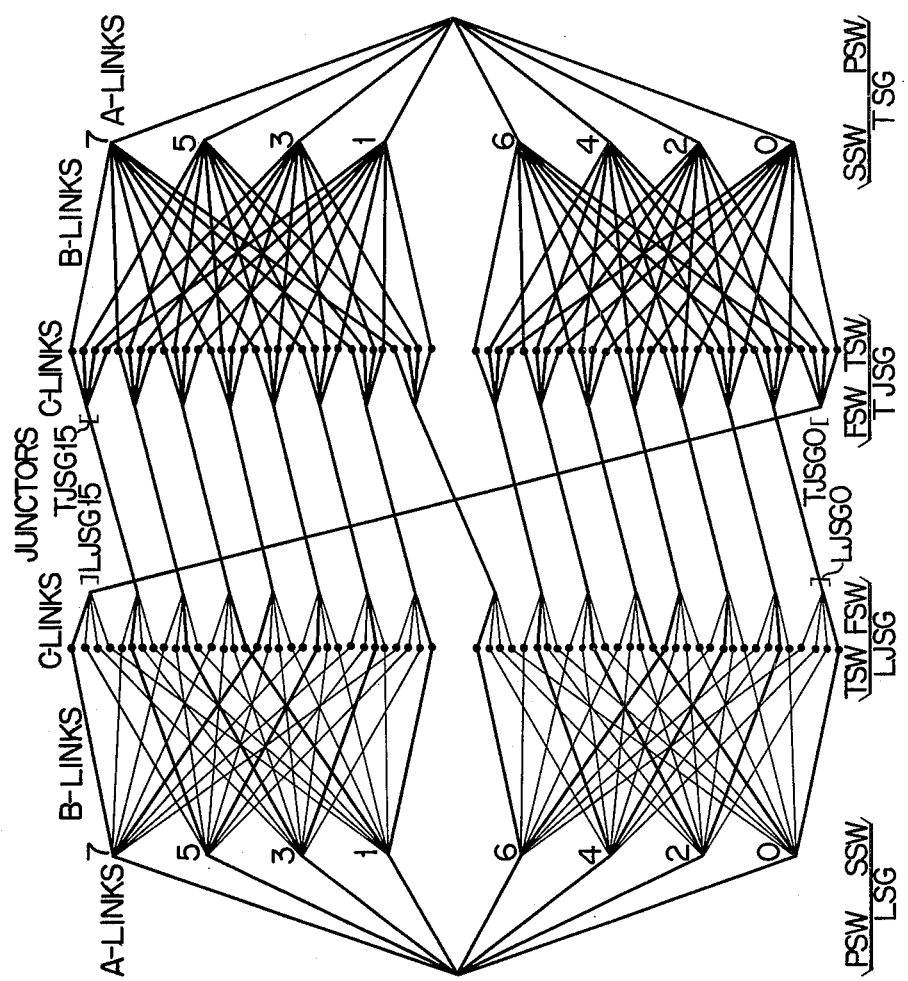
FIG. 12 is a view showing a channel graph (heavy lines) representative of the path of a 6-stage arrangement which is included in a channel graph (thin lines) representative of the path of a 8-stage arrangement.

As shown in FIGS. 8 to 11 the path in the virtual link frame is provided by fixedly closing a specified cross point and a specified (B) link is connected through the fixed cross point to a specified single (C) link. In the above-mentioned crossbar switch it is possible to connect eight (C) links to a specified (B) link. However, a path selection range should be so selected that only a specified (C) link is used for a specified (B) link and the other links are not used. The path can be expressed by a channel graph as shown in FIG. 12. FIG. 12 is the channel graph for an 8-stage switching network, showing all paths as obtained when one terminal at the inlet side of PSW in LSG is connected through the junctor in the 1 junctor sub-group to one terminal at the outlet side of PSW in TSG. In FIG. 12, nodes represent switches and branches represent links and junctors. A heavy line (FIG. 12) connecting SSW in LSG to FSW in LJSG corresponds to a junctor between SSW in LSG and FSW in TJSG as obtained by fixedly closing each switch in FIGS. 8 to 11. In consequence, the 6-stage switching network is completely included in the channel graph of the 8-stage switching network. In this way, the relation that the channel graph of the switching network of lower size constitutes a sub-channel graph for the switching network of upper size is called a "degenerative relation".

A switching network in the degenerative relation as obtained by removing switches of specified stage is called a "degenerative type switching network".

Figure 13:
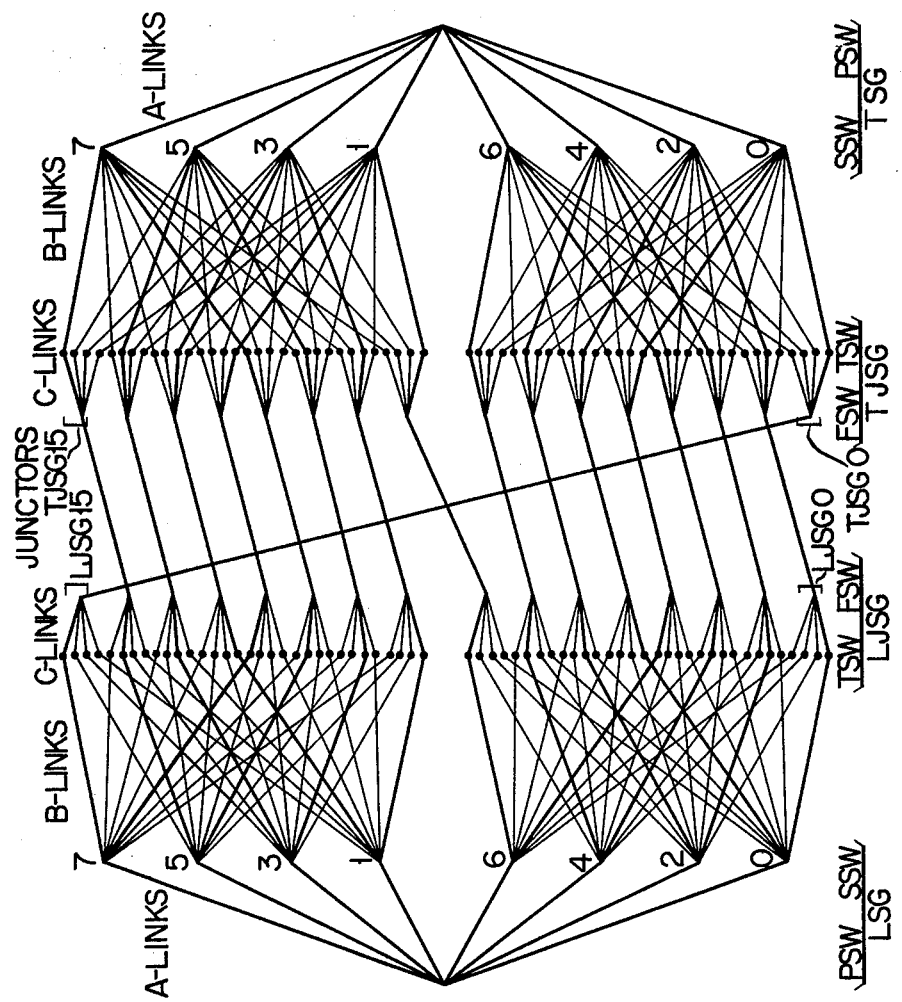
FIG. 13 is a view showing a channel graph representative of a 4-stage switching network (heavy lines) which is included in a channel graph representative of a 8-stage switching network.

FIG. 13 is a channel graph showing that a 4-stage switching network is indicated by heavy lines is included in a 8-stage switching network as indicated by thin lines. When in FIGS. 12 and 13 the switching network is degenerated from the upper size to the lower size, the paths as indicated by heavy lines in the channel graph in FIGS. 12 and 13 are selected. In this case, however, it is necessary to exclude those links (indicated by thin lines) not covered by the heavy lines. An additional control mechanism (mask method) is provided to restrict the selection range of the path. It is to be noted that, since in this case a switch control order is delivered to the nonexistent switch in the virtual link frame of a degenerative switching network, it is suppressed within a switch control device.

Explanation has been made of an outline of the degenerative type switching network and regulations on the closure mode of the virtual switch. How a path selection is effected is now explained.

Figure 14:
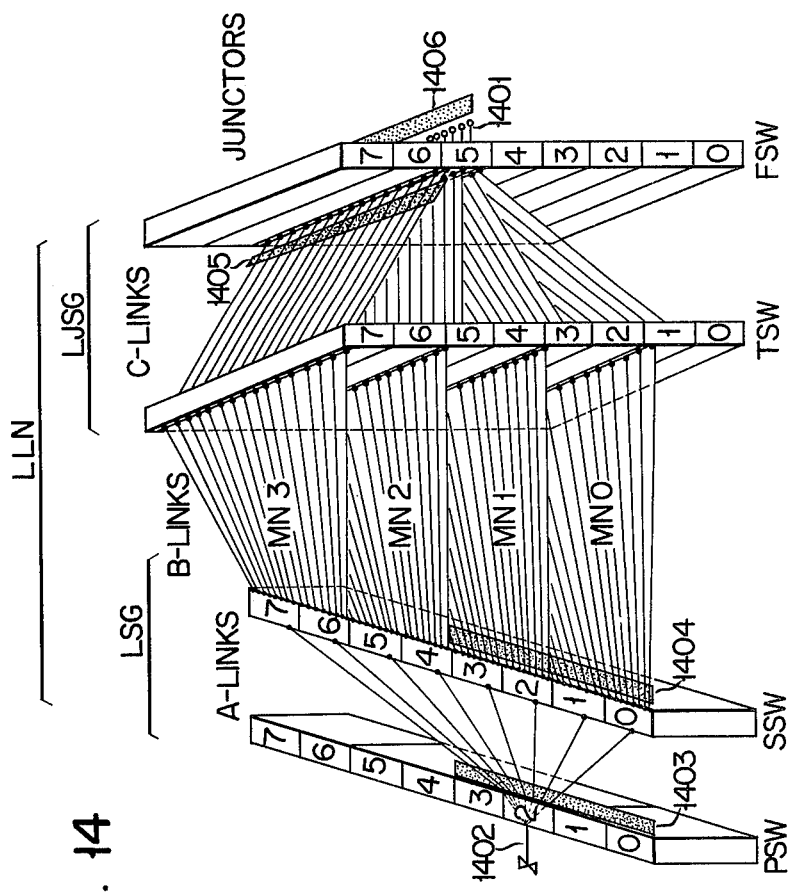
FIG. 14 is an explanatory view showing a path structure in the 8-stage switching network.

FIG. 14 shows one mode of a path selection at LLN of an 8-stage switching network. The same is true for a TLN side. In FIG. 14 are diagrammatically shown all the paths connected between a selected junctor sub-group 1401 and a specified line terminal 1402 in LSG. The line terminal 1402 in LSG is A-link coupled through a switch SW2 to SSW. Each of four paths (hereinafter referred to as path groups) having switch numbers (0,1), (2,3), (4,5) and (6,7), respectively, constitutes a group of 16 paths and is connected through TSW in LJSG to the junctor sub-group 1401 at the outlet side of FSW. The four path groups are each referred to as a multiple group number (MN) (equation (4)) and sequentially expressed by MN0, MN1, MN2 and MN3, respectively, constituting a unit for a channel match. The same path structure is applicable to B links between SSW and TSW in TLN and further explanation is therefore omitted.

Figure 15:
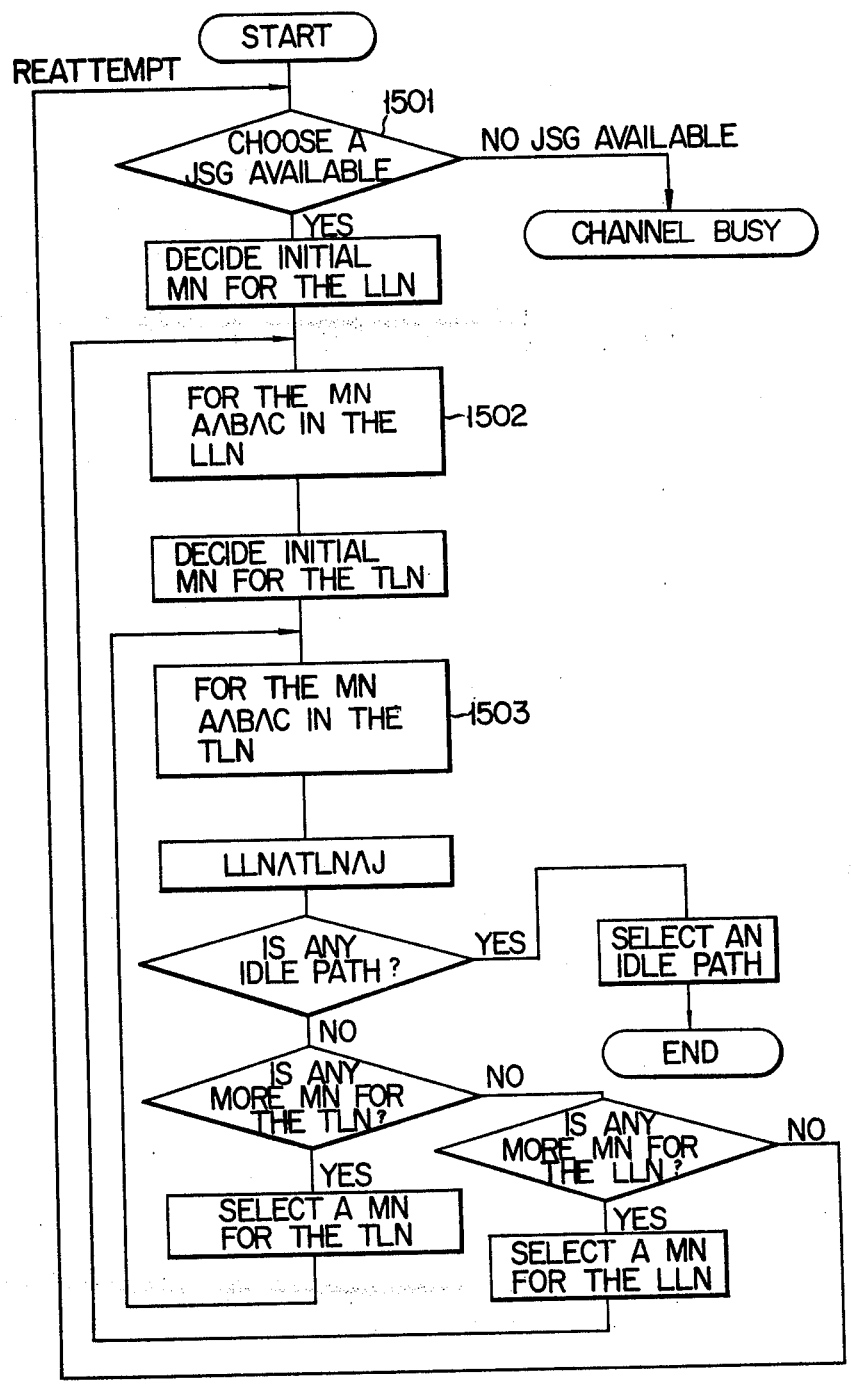
FIG. 15 is a flow chart for explaining a path selection process.

FIG. 15 is a flow chart showing a path search as to how a signal inputted to one terminal of PSW of LSG in LLN is delivered through any selected path to the junctor sub-group 1401 of FSW in LJSG. Based on the start order of any selection operation, judgement is made as to whether or not any available JSG can be selected (1501). If the answer is in the negative the channel is judged as "busy" and if the answer is in the affirmative the multiple group number MN in LLN is decided and then the match of 16 parts in the A link, B link and C link in LLN is determined with respect to the MN (1502). After the decision of MN in TLN the match of the A link, B link and C link in TLN is effected with respect to the MN (1503). Then, judgement is made as to whether or not there is any idle path, considering the match of 16 paths over LLN, TLN and junctors. If the answer is in the affirmative, an idle channel is selected, completing its selection operation. If, on the other hand, $$PN = \overline{|Y_2Y_1 + Y_5Y_4 + M_1M_0|Mod\ 4\ldots} \quad (5)$$

Table 1

| Pattern No. \ LJSG No. | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | 0 | 0 | 0 | 1 | 0 | 0 | 0 | 1 | 0 | 0 | 0 | 1 | 0 | 0 | 0 | 1 |
| 1 | 0 | 0 | 1 | 0 | 0 | 0 | 1 | 0 | 0 | 0 | 1 | 0 | 0 | 0 | 1 | 0 |
| 2 | 0 | 1 | 0 | 0 | 0 | 1 | 0 | 0 | 0 | 1 | 0 | 0 | 0 | 1 | 0 | 0 |
| 3 | 1 | 0 | 0 | 0 | 1 | 0 | 0 | 0 | 1 | 0 | 0 | 0 | 1 | 0 | 0 | 0 | where
1: available
0: not available a mismatch is involved and the answer is in the negative, judgement is first made as to whether or not the other MN's at the side of TLN can be selected. If the answer is in the affirmative the available MN is selected and the above-mentioned process is repeated from (1503). If the answer is in the negative, judgement is made as to whether or not the other MN's at the side of LLN can be selected. If possible, the available MN is selected and the above-mentioned process is repeated from (1502). In this way, tests are conducted over any combination of all the MN's in both TLN and LLN and, if even in this case no match can be obtained, a sequential JSG change is made.

Figure 16:
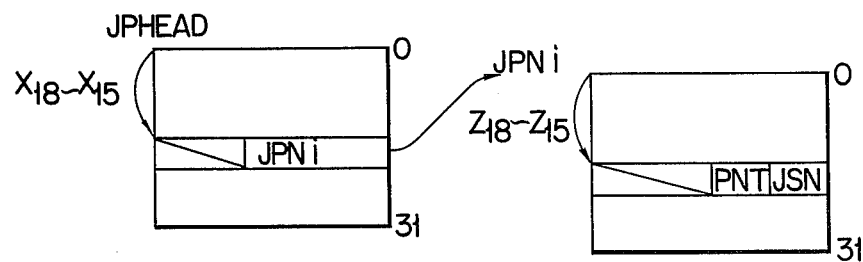
FIGS. 16 and 17 are tables utilized in selecting junctor sub-groups.
Figure 17:
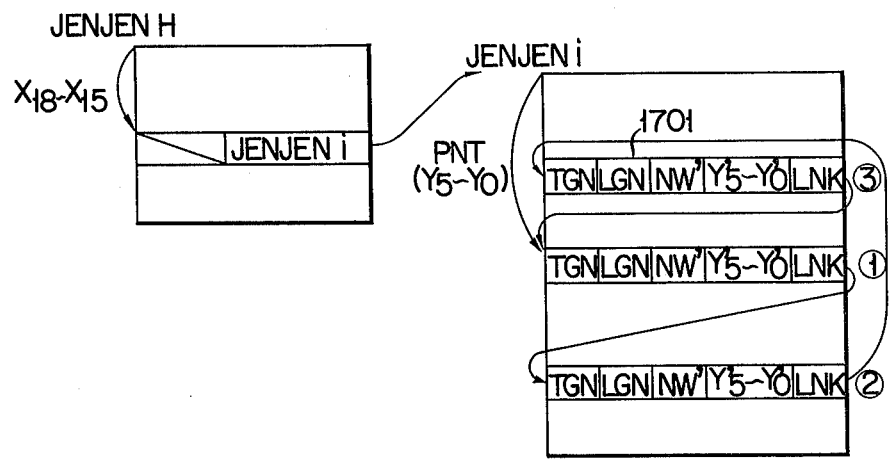
Figure 18:
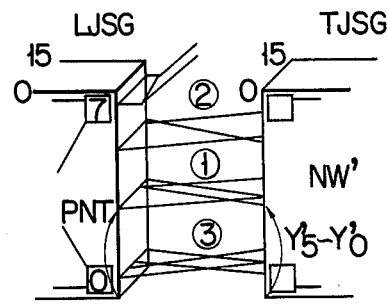
FIG. 18 is a view showing the connection of junctor sub-groups in FIG. 17.

FIGS. 16 and 17 are Tables for selecting in the order of ①→②→③→① . . . junctor sub-groups connected between a specified LLN and a specified TLN as shown in FIG. 18. A JPNi word can be read from the LLN numbers $X_{18}$ to $X_{15}$ and TLN numbers $Z_{18}$ to $Z_{15}$. A JSG group number JSN and PNT of JSG to be first selected are stored in the JPNi word. The PNT corresponds to junctor terminal numbers $Y_5$, $Y_4$, $Y_3$, $Y_2$ and $Y_1$. With PNT as an index any relevant word is read from Table in FIG. 17. This word stores a corresponding Network Number NW' and its level numbers $Y_5'$, $Y_4'$, $Y_3'$, $Y_2'$, $Y_1'$, $Y_0'$ as well as a data LNK by which JSG to be next selected is designated. The junctor sub-groups connected between the networks to be connected by a data LNK are coupled in the order of a cyclic linkage①②③④ . . . Each time JSG is selected by the data LNK the PNT shown in FIG. 16 is renewed, averaging the service frequency of the junctor.

Figure 19:
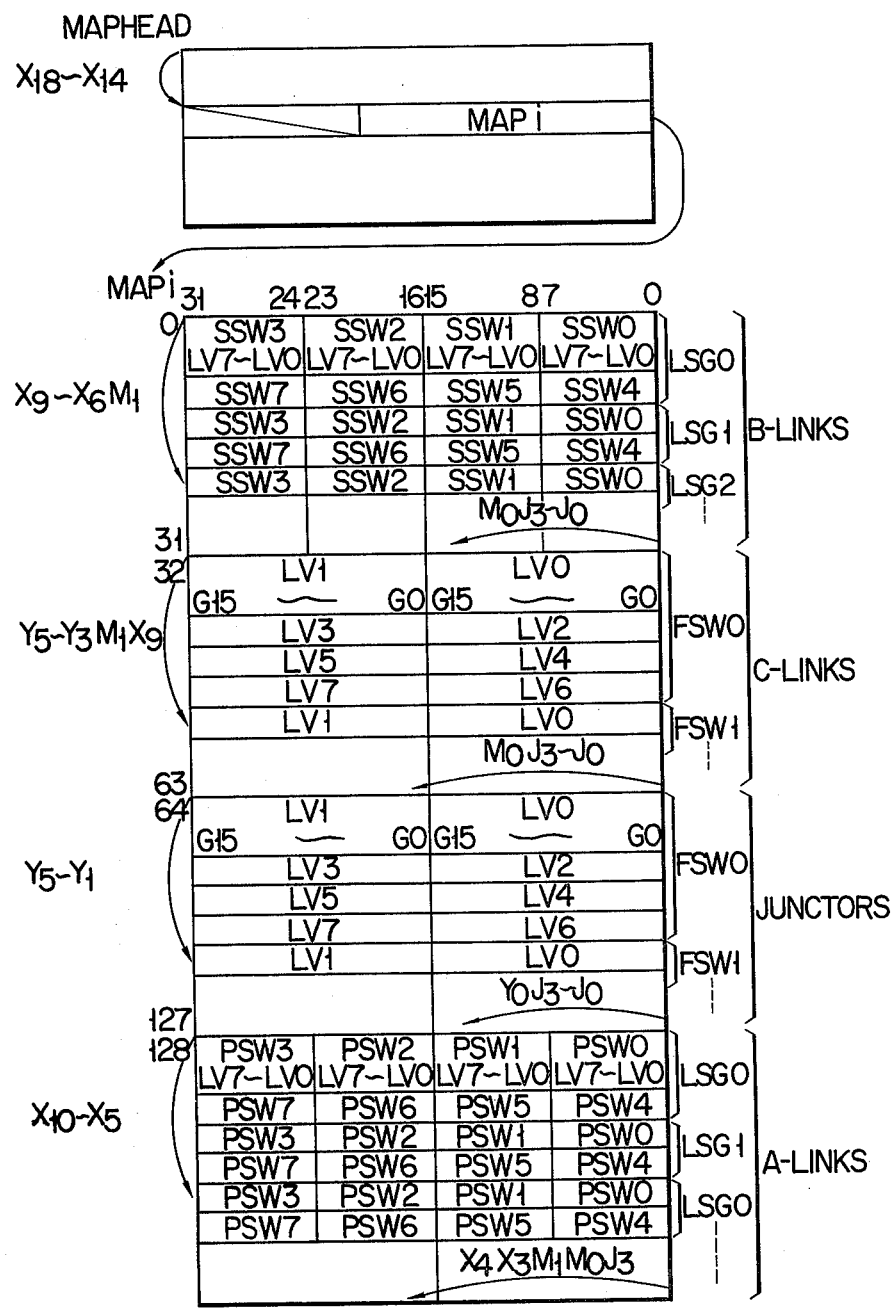
FIG. 19 is a table showing a busy/idle record of each link.

FIG. 19 is a MAP showing the busy/idle record of each link. The A links, B links, C links and junctors are stored in a manner to correspond to the terminals 1403, 1404, 1405 and 1406, respectively, shown in FIG. 14 and the sequence of their arrangement is shown in Table in FIGS. 16 and 17.

The path selection mechanism of the 8-stage switching network has been outlined. Let us now explain the degenerative type 6-stage switching network together with the selection logic.

Figure 20:
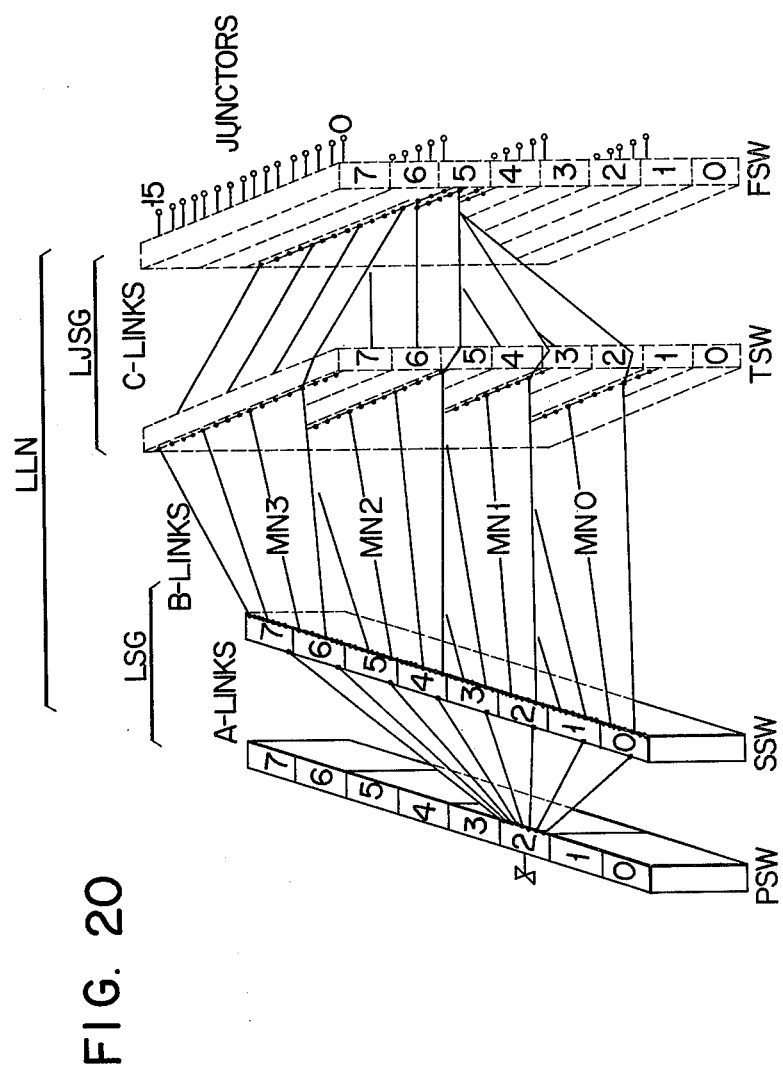
FIG. 20 is a view showing a 6-stage switching network in which virtual switches are applied to TSW and FSW in the switching circuit in FIG. 14.
Figure 21:
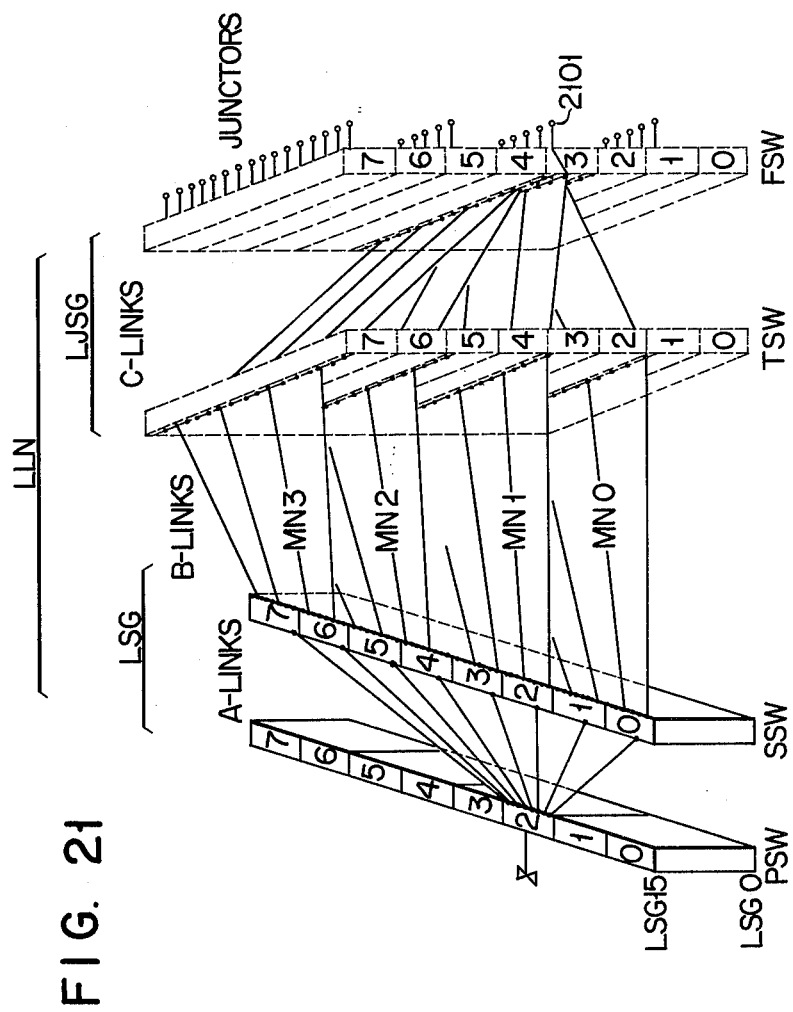
FIG. 21 is a view showing the case where the link receiving pattern of each MN in FIG. 20 is varied by the selection of junctor sub-groups.

FIG. 20 shows a degenerative switching network to which are applied fixedly closed virtual switches corresponding to the two stage portion. As will be apparent from FIG. 20, only 4 pairs of paths per MN can be utilized in this embodiment. The four pairs of paths are equidistantly arranged in the same MN and the receiving pattern of links available in each MN differs for each MN. As shown in FIG. 21, when the JSG change is made, the four pattern remains unchanged, but a combination of the MN numbers with the patterns is varied. If in this case the pattern number is defined as shown in Table 1, a relation of the pattern numbers to the junctor receiving position number and multiple group number can be expressed as follows:

From this it is suggested that the reduction of paths as resulting from the degeneration of the 8-stage switching network to the 6-stage switching network can be absorbed by the use of a mask pattern. As will be apparent from FIG. 16 the junctor sub-group for the 6-stage switching network is used exclusively as a specified LSG. For example, the junctor sub-group 2101 is used exclusively for LSG15 in PSW and there exists no other path extending from the junctor sub-group 2101 to the other LSG. This means that in the above-mentioned 8-stage switching network the available junctor sub-group can be decided from the network number belonging to both the terminals of the junctor sub-group while in the degenerative 6-stage switching network further LSG number is necessary. Therefore, a means for covering the speciality of the degenerative 6-stage switching network should be provided for the JSG selected procedure 1501 and the channel match procedure 1502 in LLN as included in a flow chart for the channel match for the 8-stage switching network shown in FIG. 15.

Figure 22:
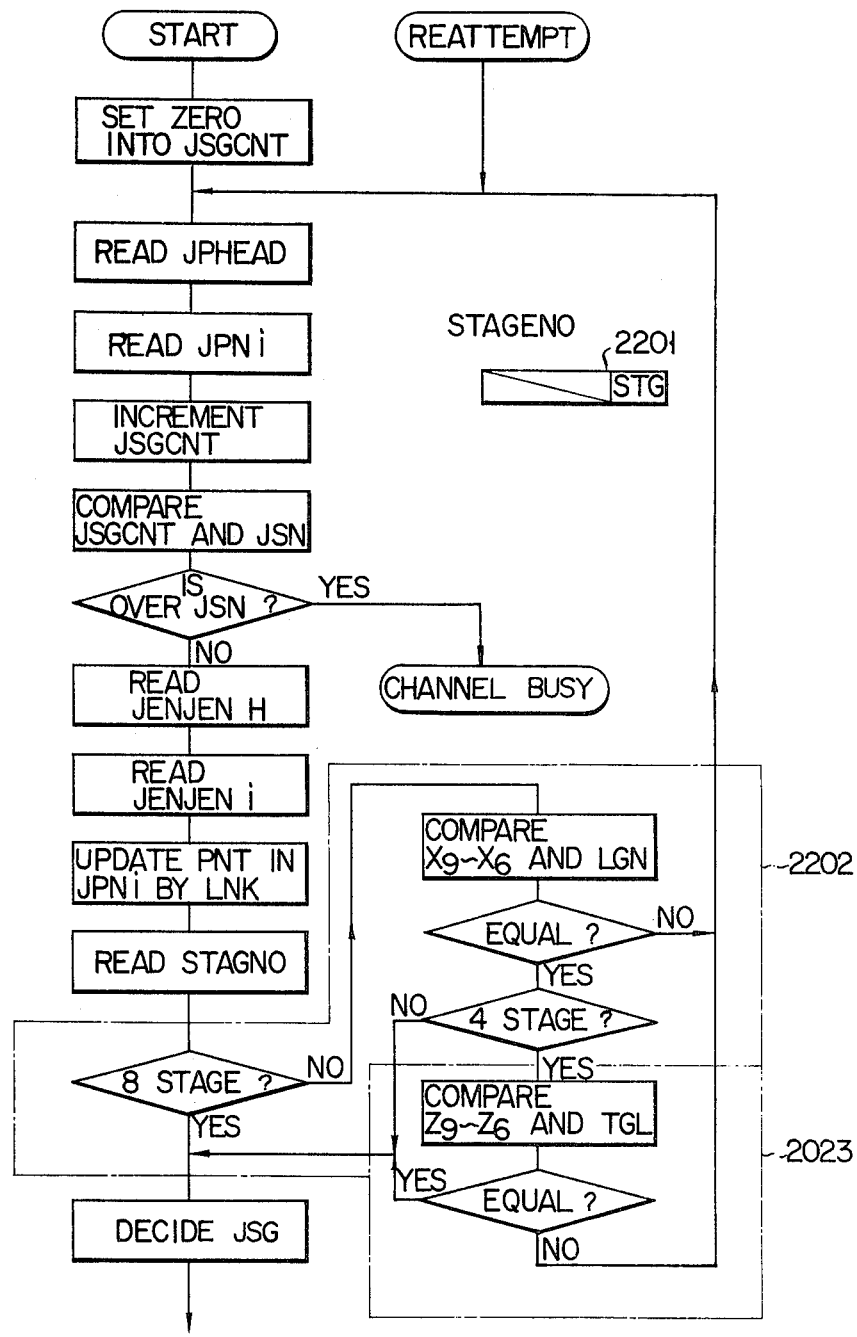
FIG. 22 is a flow chart for explaining by reference to tables in FIGS. 16 and 17 the procedure of deciding junctor sub-groups to be selected in the case of the 8-, 6- and 4-stage arrangements.

FIG. 22 is a flow chart for explaining by reference to Table in FIG. 16 a procedure for determining the junctor sub-group to be selected in the degenerative 6-stage switching network. In this case, three data items should be beforehand prepared to control the 6-stage degenerative switching network. A first data item is a word STAGE No. (2201 in FIG. 22) in which a numerical value representing a stage number is stored. A second data item is LGN (1701) which is the LSG number stored in each work in the JENJENi Table in FIG. 17 and exclusively used for the junctor sub-group corresponding to each word. A third data item is a mask pattern data (FIG. 23) as will be later described. The flow chart of FIG. 22 shows the realization of three functions.

(1) A counter JSGCNT controls the number of times the junctor sub-group is selected (set "0" into JSGCNT-read JPHEAD by indexes $X_{18}$ to $X_{15}$ - read JPNi by indexes $Z_{18}$ to $Z_{15}$ - increment JSGCNT - compare JSGCNT and JSN). If the result of comparison exceeds the number of junctor sub-groups JSN present in the specified corresponding network, the channel is judged as "busy".

(2) When the result of comparison does not exceed the number of junctor sub-groups JSN, JENJENH is read out by indexes $X_{18}$ to $X_{15}$ and the junctor sub-group in the JPNi word as indicated by PNT is selected for readout.

(3) In readiness for a subsequent selection, LNK in a JENJENi word as indicated by PNT is substituted in PNT portion of the JPNi word for renewal and the STAGENO is read out. If the readout STAGENO is 6, a process as indicated by (2202) is added and a comparison is made between an LSG number ($X_9$ to $X_6$) and LGN is the JENJENi word. If non-coincidence results, it is dealt with as in the case of the mismatch of the junctor sub-group and the selection of the junctor sub-group is restarted. In the case of a coincidence the junctor sub-group for a 6-stage is selected for decision. In this way, the selection range of the junctor sub-group can be restricted.

Figure 23A:
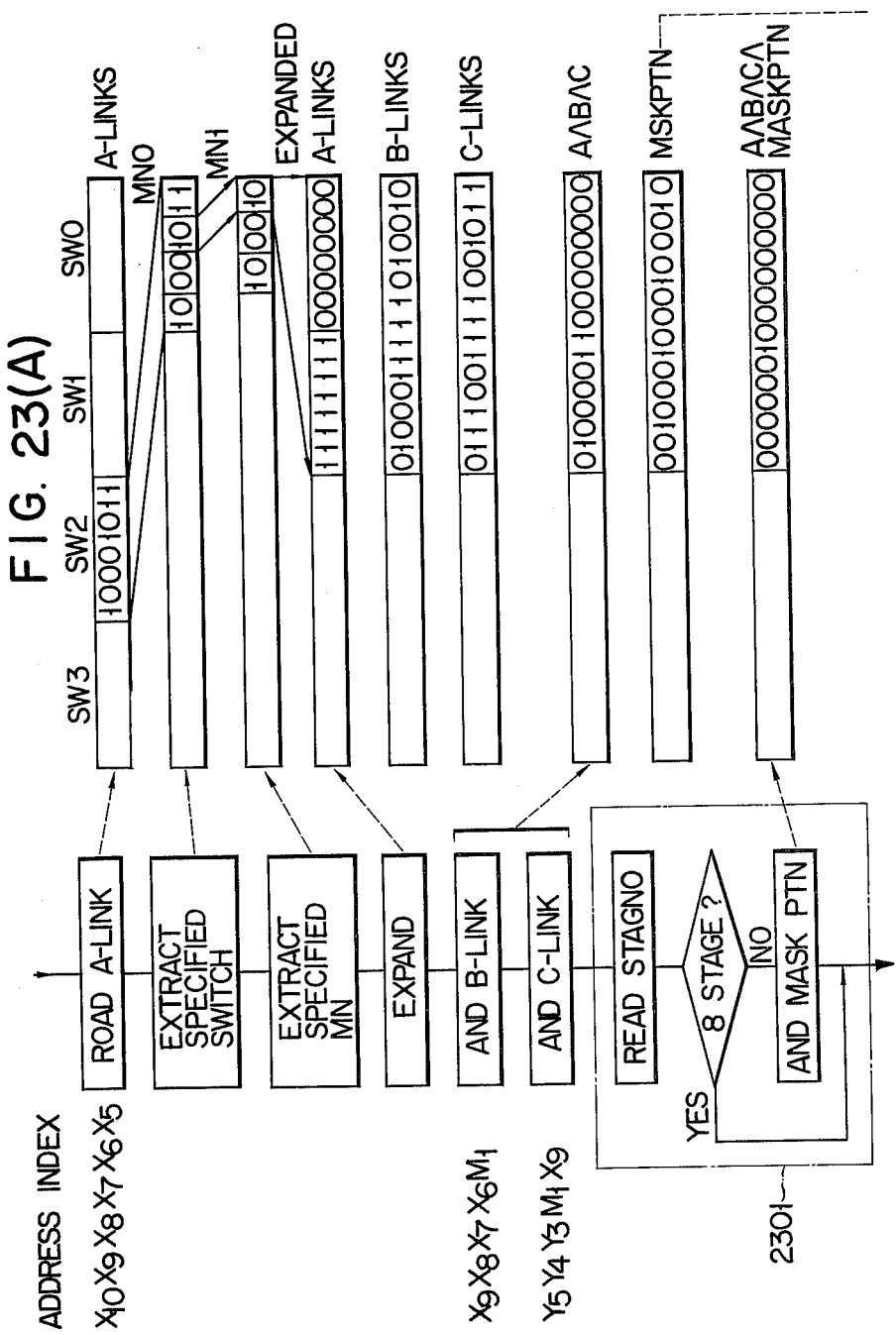
FIG. 23(A) and FIG. 23(B) are a flow chart for explaining a channel match in LLN.
Figure 23B:
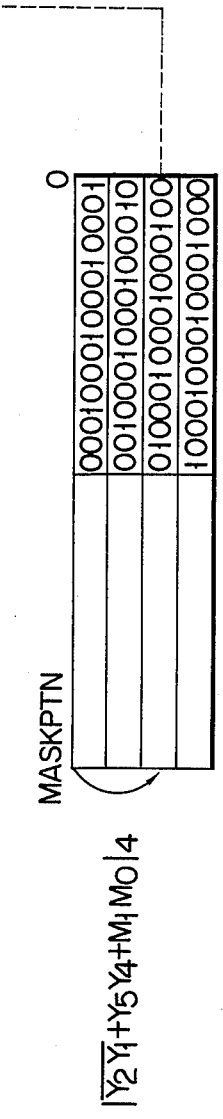

FIGS. 23(A) and 23(B) show a flow chart for explaining a channel match in LLN and a diagram showing the closure mode of switches in the A link B link and C link in each treatment process as well as the state of calculation. In FIGS. 23(A) and 23(B) calculation of the expanded A link, B link and C link, though somewhat different from each other, is effected by a known method as disclosed in BSTJ Vol. XLIII No. 5 pt2 p2208 et seq. and a match in LLN is taken. Here, a mask pattern MSKPTN constituting the third data used for a 6-stage control is cited through a relation expressed by the equation (5) and used to restrict an available range in the 6-stage. In order to cover the speciality of the 6-stage switching network the procedure (2202) (FIG. 22) for restricting the available range of the junctor sub-group is added and further procedure (2301) is also added to cause one of mask patterns to be applied to the result of the match in each link, thus determining a final selection path. By adding in this way the above-mentioned first, second and third data and the additional means for executing the above-mentioned two simple procedures it is possible to incorporate the channel selection algorithm of the degenerative type 6-stage switching network into the 8-stage switching network. Even in the 6-stage switching network, the make busy state on a map of the path after the channel selection, as well as the editing of a close or release order to a switch controller, is exactly the same as in the 8-stage switching network.

Although the above-mentioned explanation is directed to the degenerative type 6-stage switching network, even when the degenerative type 6-stage switching network is modified to a degenerative type 4-stage switching network through TJSG degeneration, it is only necessary that the procedure taken at the LLN side of the 6-stage switching network be followed at the TLN side. This can be realized by setting a TGN field for storing a TSG number in the JENJENi table in FIG. 17, comparing the TGN with Z9 to Z6 of the TSG number (2203 in FIG. 22) and adding to the process 1503 in FIG. 15 the same process as adding the mask process applied in FIGS. 23(A) and 23(B) at the LLN side so as to attain a channel match for the degenerative type 4-stage switching network. The other procedure is the same as in the degenerative type 6-stage switching network.

The control of a switching network equipment will be explained below.

Figure 24:
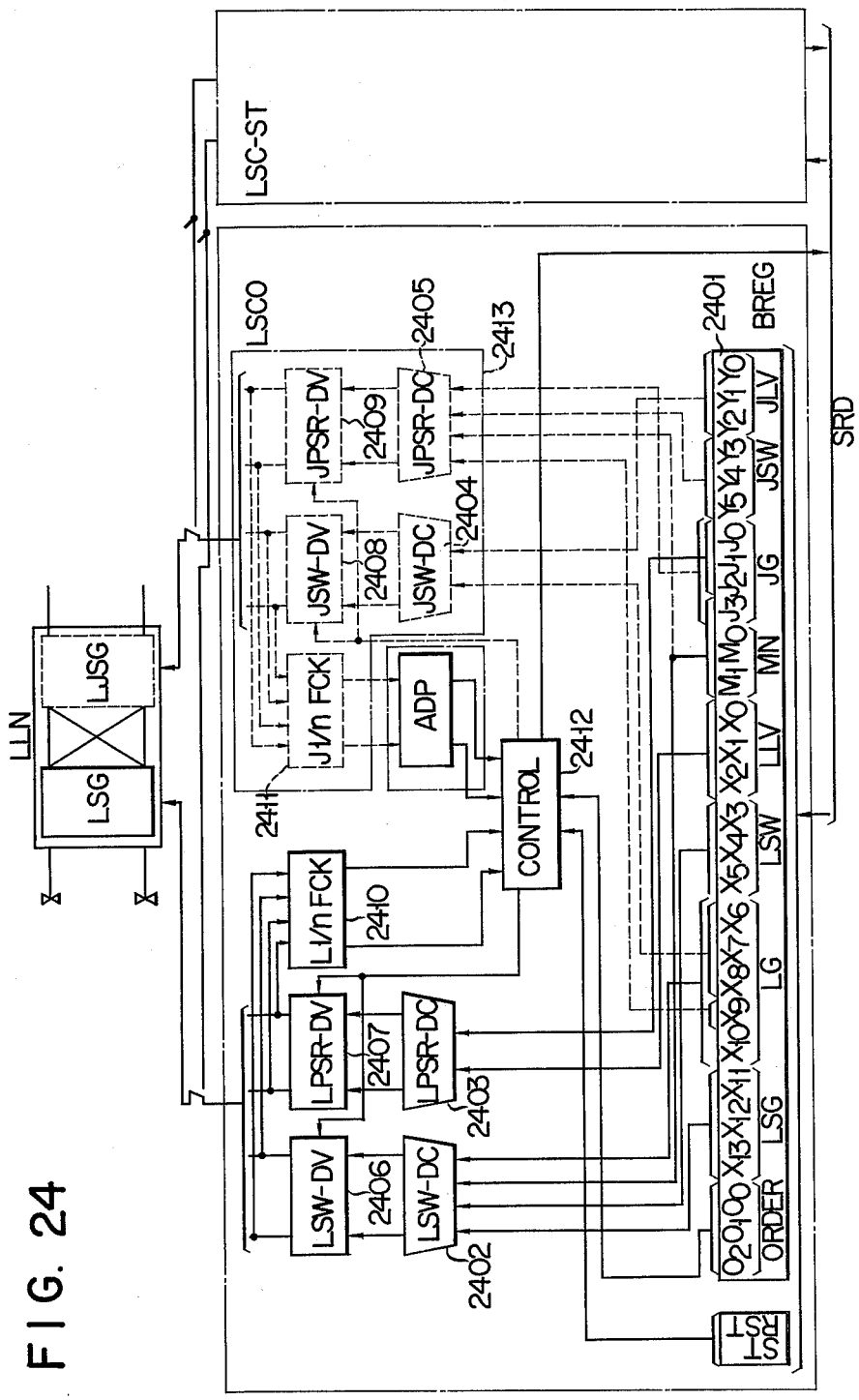
FIG. 24 is a schematic view showing a switch controller to the 8-stage switching network.

The selection control of the above-mentioned degenerative type 6- and 4-stage switching networks can be attained by providing with respect to a selection control mechanism an additional control mechanism for restricting the available range of JSG and the available range of the B link between SSW and TSW and of the C link between TSW and FSW. The other treatment is the same as in the case of the 8-stage switching network. In consequence, the same operation order as that used in the switching network is delivered to a switching control device (SC) for the degenerative type switching network. Since, however, the virtual switches are driven in this case, a means must be taken for preventing a check resulting therefrom. FIG. 24 is a schematic view showing a switch controller of the 8-stage switching network. Those block circuit portions as indicated by dotted lines in FIG. 24 show a control circuit portion for the degenerated 6-stage switching network. As will be apparent from FIG. 24 the switch controller includes a buffer register circuit (BREG 2401) for storing a control order sent from a central control equipment CC through a signal receive and distribution controller, decoder circuits (2402, 2403, 2404, 2405) adapted to decode control order data, driver circuits (2406, 2407, 2408, 2409) adapted to power drive relays, switches etc. by the output of the decoder, check circuits (2410, 2411) adapted to monitor the control current and check "one out of $n$" etc., a control circuit (2412) for effecting a sequence control such as the order discrimination, timing, check etc. of the control order.

Figure 25:
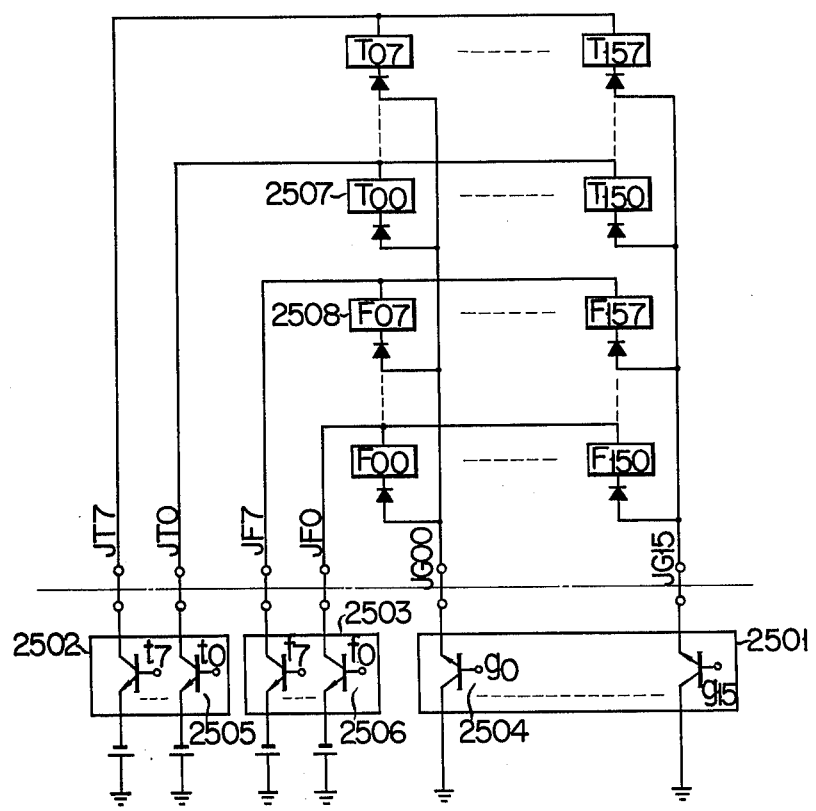
FIG. 25 is a detailed view showing a path selection relay (PSR)

Each switch of PSW to FSW in LLN is driven in the following two stages. A path selector relay (PSR) provided in a manner to correspond to switches to be first selected is operated. FIG. 25 shows a detail of the PSR drive circuit (2409 in FIG. 24). The PSR drive circuit includes a 1/16 driver 2501 for a LJSF selection, a ⅛ driver 2502 for a TSW selection and a driver 2503 for FSW. The driver circuit 2501 includes switches $g0$ to $g15$ for TSW and FSW selection, driver circuit 2502 includes switches $t0$ to $t7$ for TSW and FSW selection and driver circuit 2503 includes switches $f0$ to $f7$ for TSW and FSW selection. Two PSR's are connected between the switches of the respective drivers. Suppose, for example, that TSW0 and FSW7 of LJSG0 is selected. In this case, the switch $g0$ (2504) in LJSG selection driver and switch $t0$ (2505) in the TSW selection are both driven to cause T00 (2507) in PSR to be operated to permit TSW0 in LJSG0 to be selected. If the switch 2506 in the FSW selection driver 2503 is driven, F07 (2508) in PSR as situated between the switch $f7$ in (2504) and the switch $g0$ in (2504) is operated, causing a drive lead of the corresponding switch to be pulled in the switch drive circuit to permit FSW7 to be selected.

Figure 26:
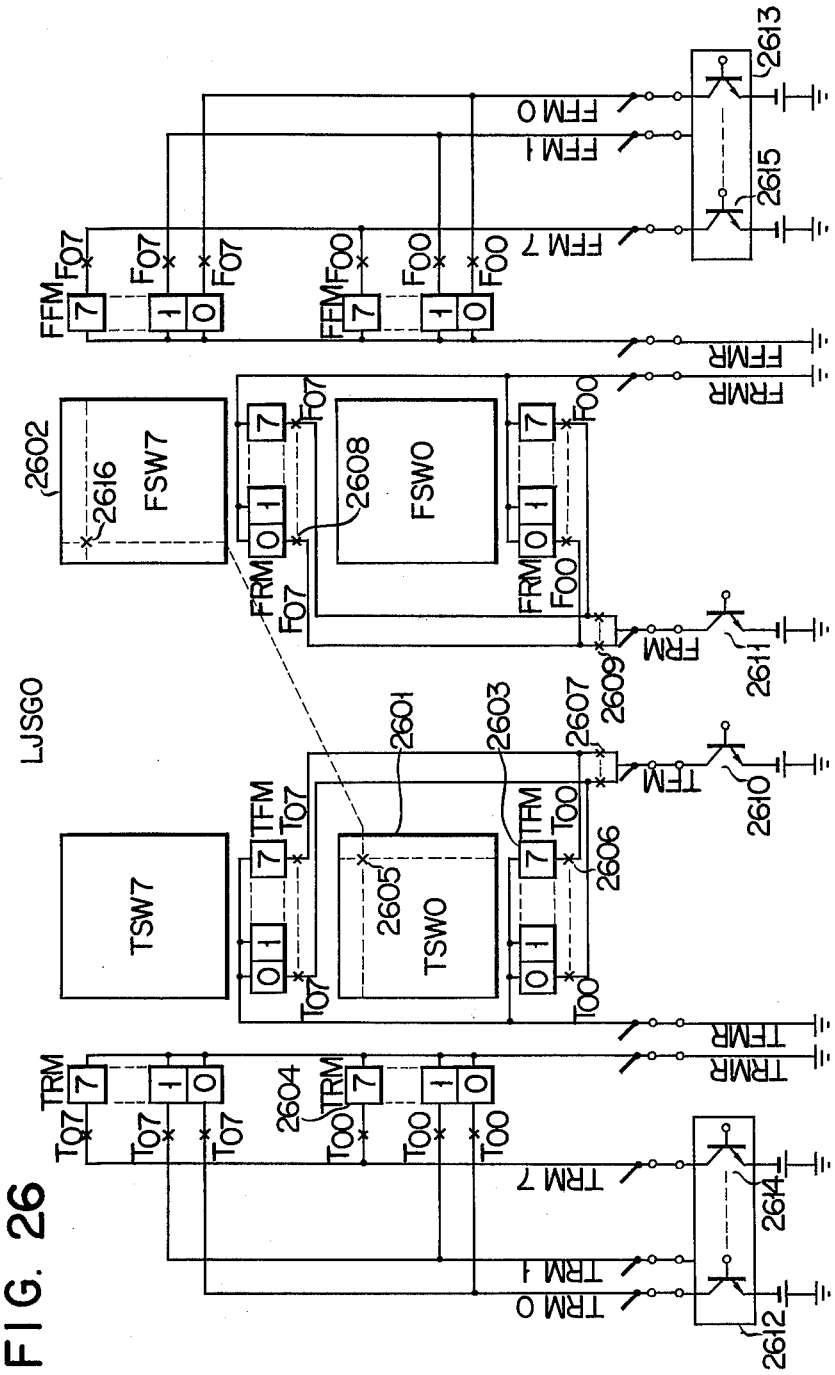
FIG. 26 shows one form of a switch control circuit.
Figure 27:
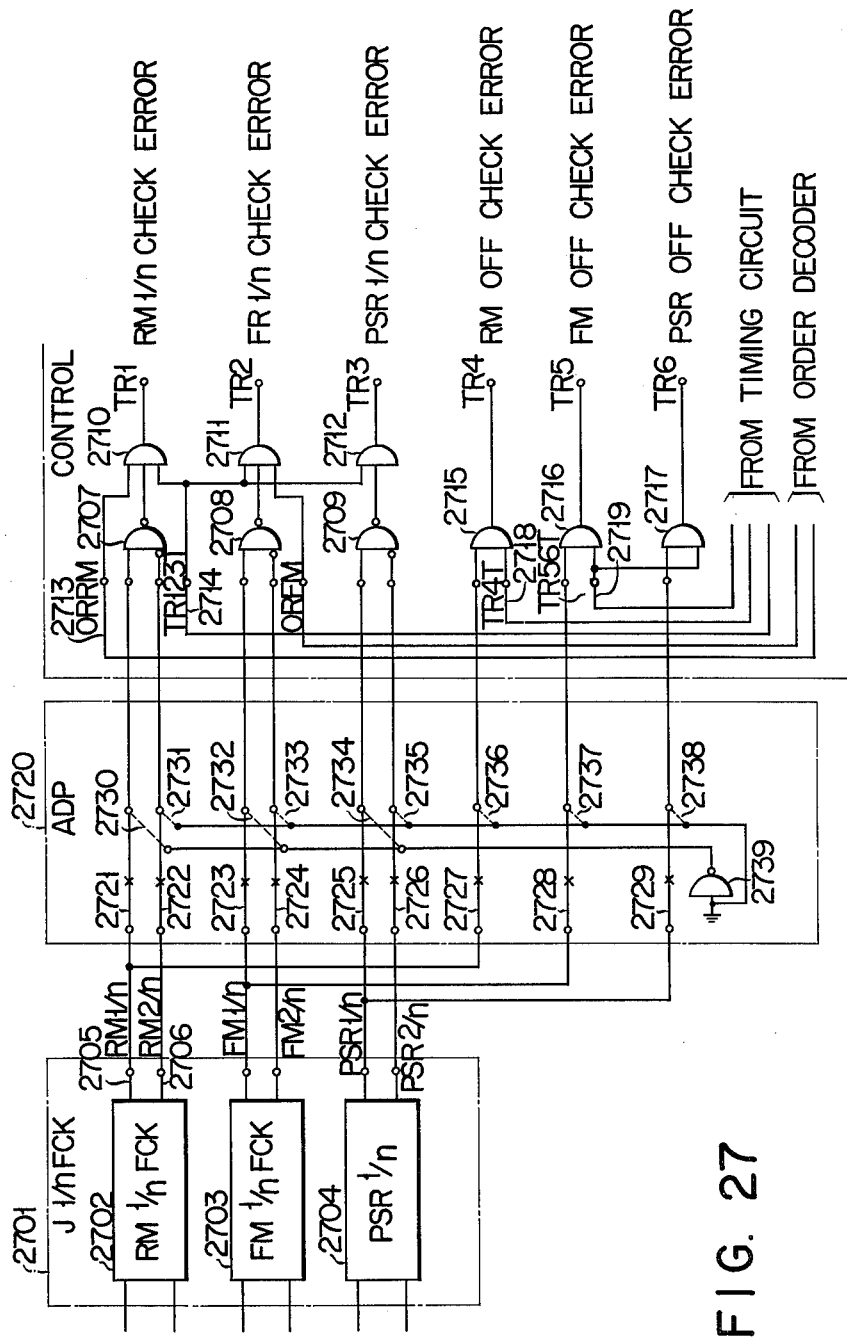
FIG. 27 is a view showing a control current check circuit and its associated circuit.

Then, the selected switches TSW0 and FSW7 are driven. FIG. 26 show a drive circuit for TSW0 and FSW7. The drive process will be explained below by taking TSW0 by way of example. If a finger magnet FM(2601) on the X-axis and a reset magnet RM(2604) on the Y-axis of TSWO are driven for a short time (about 6 ms), an intersection 2605 is closed and mechanically latched. The latched state of the intersection (2605) can be released by driving the RM only on the Y-axis of TSWO. If, as shown in FIG. 3, inlet and outlet switches are determined in a 2-stage switch structure comprises of the grid plate, then a link between these switches is automatically determined. In the arrangement shown in FIG. 26 TFM7 in TSWO and FRMO in FSW7 are automatically selected by selecting a combination of contacts 2606 and 2607 in TOO with contacts 2608 and 2609 in F07. These magnets in FIG. 25 are driven by drivers 2610 and 2611, respectively. If a switch (2614) for driving TRM7 and switch (2615) for driving FFM7 are rendered ON, an intersection 2605 in TSWO and intersection 2616 in FSW7 are closed. A drive current check circuit and its associated circuit as shown in FIG. 27 are provided to check whether or not a drive current for executing the ON-OFF control of each switch in LJSG flows in an normal fashion. The drive current check circuit 2701 in FIG. 27 comprises a reset magnet drive check circuit 2702, a finger magnet drive check circuit 2703 and a PSR drive check circuit 2704. These check circuits generate an output (RM $1/n$ in 2705 in FIG. 27) representing that a drive current flows through one or more leads in a respective lead group and an output (RM $2/n$ in 2706 in FIG. 27) representing that a drive current flows through two or more leads in the respective lead group. A current flow through only one lead can be checked by an output RM $1/n \times \overline{\text{RM } 2/n}$. An AND circuit 2707 is a logic circuit for obtaining a check output of a reset magnet drive lead; an AND circuit 2708, a logic circuit for obtaining a check output of a finger magnet drive lead; and an AND circuit 2709, a logic circuit for obtaining a check output of a PSR drive lead. There occur the cases where the reset and finger magnets are not driven dependent upon the kind of orders to SC. The check must be effected at a predetermined time of a drive cycle. For this reason, the output of the AND circuit 2707 is taken as a check signal through an AND circuit 2710. The AND circuit 2710 is also adapted to receive an output OR RM (2713) representing a reset magnet drive order from an order decoder and a timing pulse output TR 123T (2714) from a timing circuit. An AND circuit 2711 is a gate circuit similar to that used for the finger magnet. The PSR is driven by all the orders and an AND circuit 2712 is gate-controlled by a timing pulse from a timing circuit. The interruption of a drive current through all th leads can be checked by the output of $\overline{\text{RM } 1/n}$. An AND circuit 2715 is a gate for the OFF check of an RM drive lead; an AND gate 2716, a gate for the OFF check of an FM drive lead; and an AND circuit, a gate for the OFF check of a PSR drive lead. The AND circuit 2715 receives a timing pulse signal at TR4T 2718 and the AND circuits 2716 and 2717 receives a timing signal at TR56T (2719).

If a final check output appears from any of terminals TR1 to TR6, such a state is stored and the check operation is stopped in a specified sequence and the final check is displayed on CC through SRD. Although the above-mentioned explanation is directed to the LJSF control, the same thing can be said about TJSF except by the number of switches. A trunk switch controller TSC is similar to LSC and further explanation is omitted.

Below is explained a coordinating control mechanism when LJSG is degenerated. In this case, an LJSF control section 2413 in FIG. 24 is unrealized and performs the function of suppressing a drive current to nonexistent switches. However, the check output as explained in connection with FIG. 27 cannot be detected in a normal state. As a result, a sequence operation is stopped, preventing a normal switching operation at the LSG side. In order to prevent such a occurrence use is made of an adapter package equipped with an option wiring as shown in FIG. 27. In the 8-stage arrangement, wires 2721 to 2729 as indicated by solid lines in FIG. 27 are connected to the option wiring of the package, but when LJSG is unrealized the wires indicated by the solid lines are switched and wires indicated by dotted lines in FIG. 27 are connected to the option wiring of the package. In this case, a current corresponding to a value at the normal side is always delivered from a constant supply circuit 2739 to the inputs of AND circuits 2707 to 2709 and 2715 to 2717, indicating that the control of LJSF is always normal.

An obstacle resulting from the difference of those interfaces of the 6-stage and 8-stage arrangements, which are associated with the switch control section, can be completely removed by making the LJSF control section in LSC unrealized for the suppression of a drive current and incorporating a circuit 2720 for imitating a check circuit output. In the 4-stage switching network with TJSF unrealized, the same measure as taken at LSC can be applied to a trunk switch controller TSC.

The above explanation is directed to the cases where the switching network of upper size is degenerated to the switching network of lower size. Let us now consider the case where a stage increment is effected without interrupting the service of a switching network in operation.

Figure 28:
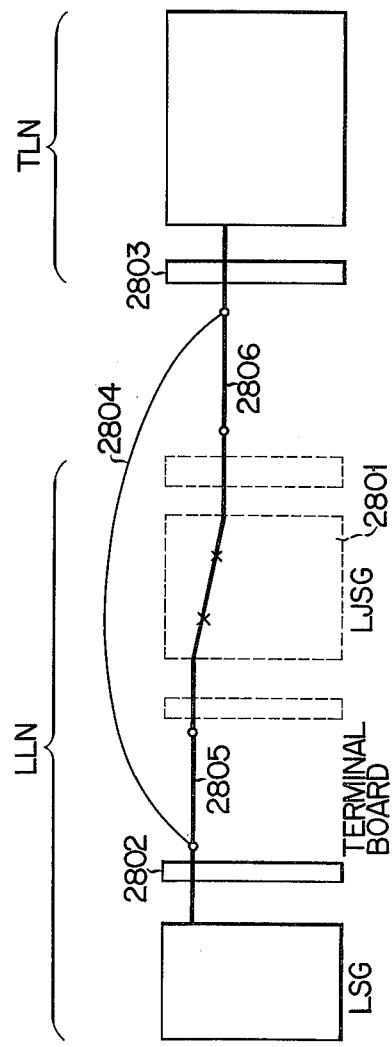
FIG. 28 is an explanatory view showing a wire replacement.

FIG. 28 shows a stage increment. With respect to a degenerative type switching network in which a wire extends as a path from a terminal board 2802 in LSG of LLN to a terminal board 2803 in TLN, a grid plate having closed switches are incorporated as LJSG at the position of a virtual link frame as indicated in dotted lines in FIG. 28. Such a stage increment installation was carried out according to the rules as shown in FIGS. 8 to 11. In this case, the wire 2804 connected between the terminal board 2802 and 2803 is replaced with wires 2805 and 2806 for test. A LJSG drive section in SC (FIG. 24) is incorporated with respect to LJSG and the adaptor package 2720 in FIG. 27 is replaced for one for 8-stage switching network which is connected at the side indicated by solid lines.

It is desirable that before the LJSG drive section 2413 is incorporated each switch in LJSF be closed according to predetermined rules. A means for closing such switches can be obtained without any particular additional device. As one example, use can be made of means as disclosed in Review of the Electrical Communication Laboratory Vol. 14, Nos. 9 to 10, 1968 p748.

Figure 30A:
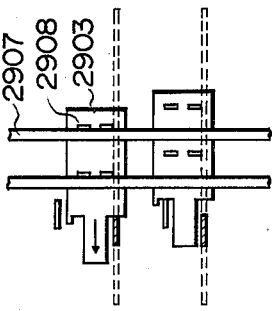
FIGS. 30(A) to 30(C) are explanatory views showing the operation of the switch structure in FIG. 29.
Figure 30B:
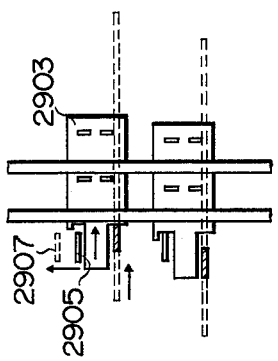
Figure 30C:
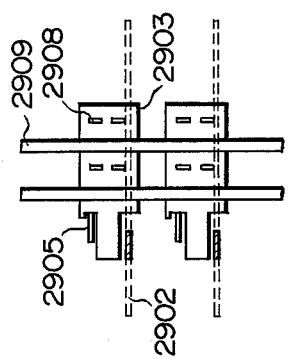

FIG. 29 is a schematic perspective view showing the above-mentioned switch structure. When a horizontal reset magnet 2901 is excited a horizontal reset bar 2902 is moved to the right as indicated by an arrow in FIG. 29, i.e. from the state shown in FIG. 30(A) to the state shown in FIG. 30(B), causing an actuating card 2903 to be moved to the right. When at this time a finger magnet 2904 is excited a finger 2905 is shifted from a position indicated by solid lines to a position indicated by dotted lines in FIG. 30(B). If at this state the excitation of the horizontal reset magnet 2901 is removed, the actuating card 2903 is returned under the resilient force of a balancing spring 2906 to the left as shown in FIG. 30(C) and the contact spring 2908 comes into contact with a vertical multistrap 2909. In order to effect a shift from the state shown in FIG. 30(C) to the state shown in FIG. 30(A) the horizontal reset bar 2902 is moved to the right by exciting the horizontal reset magnet 2901, not the finger magnet 2904. By doing so, the original position is regained. The reset bar 2902 and holding finger 2905 can be manually moved by using a switch of mechanical latch type. In the case where a magnetic latch type switch such as a Fereed switch (U.S.A. No. 1 ESS) is used, the closure of the switch can be effected by providing any particular device outside.

Once the LJSG control section is incorporated for an increment to the 8-stage switching network a word STAGE No. 2201 representing the number of the stage is rewritten for 8-stage use on the flow chart shown in FIG. 22. In this way, the stage growth is completed. Although different stages coexist during installation (replacing the wire 2804 by the wires 2805 and 2806) it is not necessary at this time to provide a corresponding control, since the incremented switch is merely used for wire switching. At the time when the adapter package is replaced by one for a 8-stage switching network the incremented stage is driven. In this case, the cross point of a switch to be closed by the drive device is situated on those contacts fixedly closed when the wires are switched. That is, the 8-stage switching network is used under the restrictive conditions of a 6-stage arrangement. This restriction is completely removed at the time when the above-mentioned STAGE No. 2201 is rewritten. Thereafter, the 8-stage arrangement is selected. Although during the growth installation the wire 2804 is explained as being replaced by the wires 2805 and 2806, this will be explained more in detail below by referring to a cable structure in which a group of wires and connectors are used.

As a wire replacement installation, as shown in FIG. 28, the existing and new wires are doubly attached on the terminal boards 2802 and 2803 and then the existing wire is removed. However, a problem arises from the standpoint of work steps. It is desirable that the replacement of wires be effected by means of connectors as will be set out below.

Figure 31:
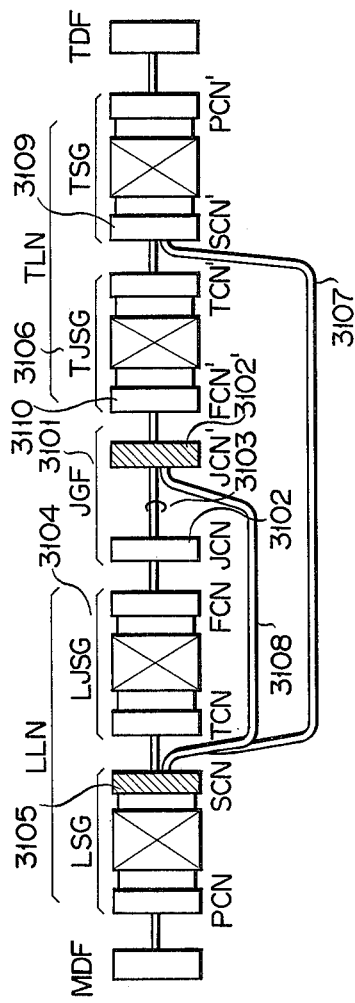
FIG. 31 is a view showing one form of connection in an exchange system.

FIG. 31 is one form of a wiring system in an exchange equipment. LJSG 3104 in LLN is connected through a junctor grouping frame JGF 3101 to TJSG 3106 in TLN. The junctors from LLN and TLN are terminated at JCN 3102 and JCN' 3102', respectively, of the junctor grouping frame JGF 3101. With an increase in the number of networks a patch code 3103 in the JGF is so connected that in order to attain the uniformity of traffic between the existing and incremented networks the redistribution of the number of junctors is effected by the above-mentioned method. The wiring between LLN and JGF involves no replacement of wires as a rule even in the case of a stage increment or growth. For this reason, a lapping terminal can be used. In this exchange equipment, connector-equipped cables are used between the grid plates to facilitate installation. In this case, SCN 3105 and JCN 3102 should have corresponding wires in connecting LJSG 3104 between SCN 3105 and JCN 3102 by the use of connectors.

Figure 32:
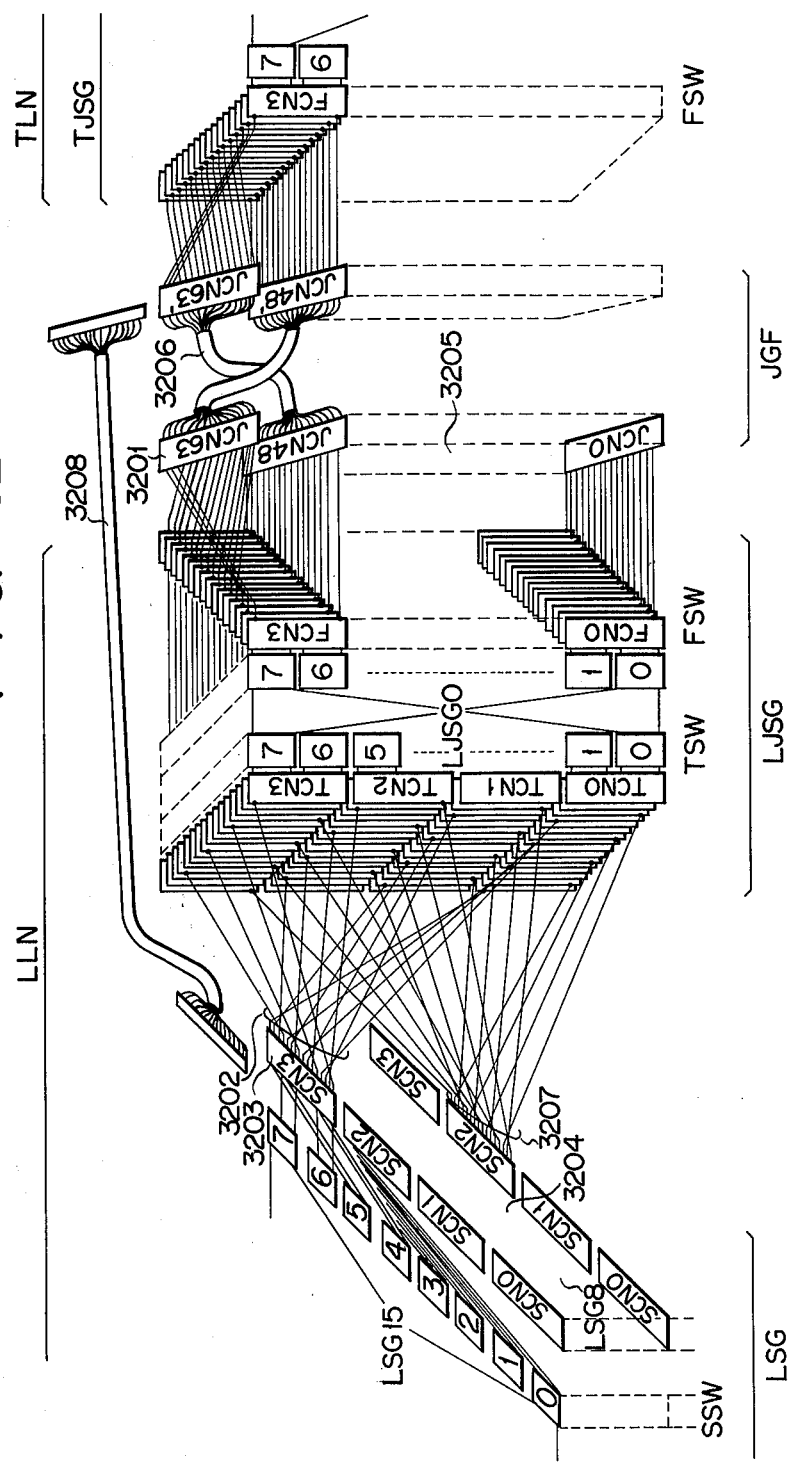
FIG. 32 is a view showing a connector-equipped cable as well as a connection between switches.

FIG. 32 is a diagrammatic view showing a connection between LSG in LLN, LJSG, JGF and TJSG in TLN. As will be apparent from FIG. 32 four connectors TCN0 . . . TCON3 are provided in a manner to correspond to TSW0 and TSW1, TSW2 and TSW3, TSW4 and TSW5, and TSW6 and TSW7, respectively. Likewise four connectors FCN0 . . . FCN3 are provided in a manner to correspond to FSW0 and FSW1, FSW2 and FSW3, FSW4 and FSW5, and FSW6 and FSW7, respectively. Each connector is connected in a manner to correspond to the level 0 (of the initial even number switch) to the level 7 of the final odd number switch. If a consecutive number is attached to the terminals of the respective connectors FCN0 to FCN3, the terminal numbers correspond to a consecutive JCN number. Those outlet terminals of FCN3 which correspond to the levels 0 to 3 of each FSW are connected in parallel to the corresponding terminals of JCN. This connection can be expressed as follows:

$$\text{JCN terminal number} = \text{LJSG number } (J_3, J_2, J_1, J_0) \quad (6)$$

Those outlet terminals of FCN which correspond to the levels 4 to 7 of each FSW are connected to the corresponding terminals of JCN as expressed by the following relation.

$$\text{JCN terminal number} = |J_3, J_2, J_1, J_0 + (Y_5 Y_4 \times 4 \times 1)| \mod 16 \quad (7)$$

If the value of the term $(Y_5 Y_4 \times 4 + 1)$ is called a slip number, then the slip number for FSW0 and FSW1 is 1, the slip number for FSW2 and FSW3 is 5, the slip number for FSW4 and FSW5 is 9 and the slip number for FSW6 and FSW4 is 13 (see BSTJ Vol. XLIII September 1964 No. 5 p2207).

JGF performs the function of distributing according to the flow of traffic the junctor sub-groups available by the rewiring of the patch code during the network growth. The junctors are enclosed in each of four groups FSW (0,1), (2,3), (4,5) and (6,7) to permit a group-wise rewiring. The junctors connected to the levels 0 to 3 of those switches in any one group which are represented by odd number are connected to the levels 4 to 7 of those switches in the associated network which are represented by even number. Those junctors connected to the levels 4 to 7 of the odd number switches are connected to the levels 0 to 3 of the even number switches in the associated network. If the fixedly closed JSG having such a relation is incorporated as shown in FIG. 32, the following path is established. 16 pairs received in JCN63 (3201) lead to the terminal number 15 of each FCN3 in a manner to have a relation of slip number 13 and divided into four MN groups in LJSG each of which correspond to 4 pairs.

Figure 33:
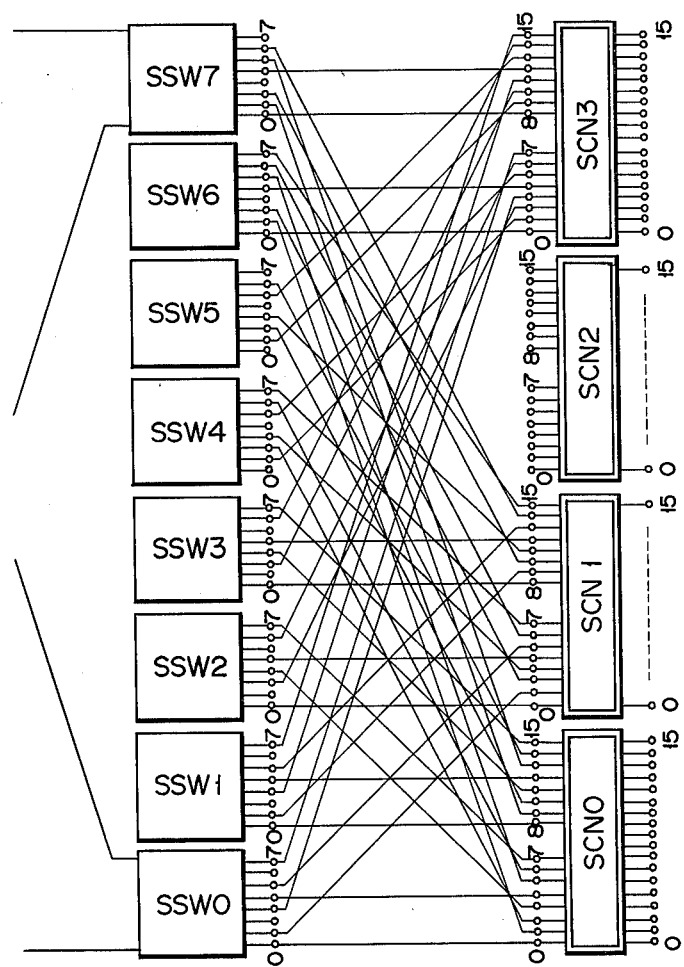
FIG. 33 is a view showing a rule according to which terminal connectors of switches are received.

The 16 pairs are collectively received in SCN3 (3202) through the four MN groups. Since the 16 pairs received in one JCN is received in one SCN, the reception of the 16 pairs into the SCN is effected based on a certain rule. This rule is shown in FIG. 33. As shown in FIG. 33, the connector of each of SCN0 . . . SCN3 correspond to the terminals of any two of SSW0 . . . SSW7, but the terminal receiving patterns of the four connectors of SCN0 . . . SCN3 are entirely different from each other. According to the wiring groups shown in FIG. 33 a surface 3204 of a secondary connector SCN, when viewed for each connector, bears a real image relation to a surface 3205 of JCN. The corresponding relation of the secondary SCN to the junctor connector JCN is shown in the following Table.

Table 2

| JCN No. | LSG Grid No. | SCN No. | Number of Slip | JCN No. | LSG Grid No. | SCN No. | Number of Slip |
|---|---|---|---|---|---|---|---|
| 31 | 15 | 1 | 5 | 63 | 15 | 3 | 13 |
| 30 | 6 | 1 | 5 | 62 | 6 | 3 | 13 |
| 29 | 13 | 2 | 5 | 61 | 13 | 0 | 13 |
| 28 | 4 | 2 | 5 | 60 | 4 | 0 | 13 |
| 27 | 11 | 3 | 0 | 59 | 11 | 1 | 0 |
| 26 | 2 | 3 | 0 | 58 | 8 | 1 | 0 |
| 25 | 9 | 0 | 0 | 57 | 9 | 2 | 0 |
| 24 | 0 | 0 | 0 | 56 | 0 | 2 | 0 |
| 23 | 7 | 1 | 5 | 55 | 7 | 3 | 13 |
| 22 | 14 | 1 | 5 | 54 | 14 | 3 | 13 |
| 21 | 5 | 2 | 5 | 53 | 5 | 0 | 13 |
| 20 | 12 | 2 | 5 | 52 | 12 | 0 | 13 |
| 19 | 3 | 3 | 0 | 51 | 3 | 1 | 0 |
| 18 | 10 | 3 | 0 | 50 | 10 | 1 | 0 |
| 17 | 1 | 0 | 0 | 49 | 1 | 2 | 0 |
| 16 | 8 | 0 | 0 | 48 | 8 | 2 | 0 |
| 15 | 15 | 0 | 1 | 47 | 15 | 2 | 9 |
| 14 | 6 | 0 | 1 | 46 | 6 | 2 | 9 |
| 13 | 13 | 1 | 1 | 45 | 13 | 3 | 9 |
| 12 | 4 | 1 | 1 | 44 | 4 | 3 | 9 |
| 11 | 11 | 2 | 0 | 43 | 11 | 0 | 0 |
| 10 | 2 | 2 | 0 | 42 | 2 | 0 | 0 |
| 9 | 9 | 3 | 0 | 41 | 9 | 1 | 0 |
| 8 | 0 | 3 | 0 | 40 | 0 | 1 | 0 |
| 7 | 7 | 0 | 1 | 39 | 7 | 2 | 9 |
| 6 | 14 | 0 | 1 | 38 | 14 | 2 | 9 |
| 5 | 5 | 1 | 1 | 37 | 5 | 3 | 9 |

T201

Table 2-continued

| JCN No. | LSG Grid No. | SCN No. | Number of Slip | JCN No. | LSG Grid No. | SCN No. | Number of Slip |
|---|---|---|---|---|---|---|---|
| 4 | 12 | 1 | 1 | 36 | 12 | 3 | 9 |
| 3 | 3 | 2 | 0 | 35 | 3 | 0 | 0 |
| 2 | 10 | 2 | 0 | 34 | 10 | 0 | 0 |
| 1 | 1 | 3 | 0 | 33 | 1 | 1 | 0 |
| 0 | 8 | 3 | 0 | 32 | 8 | 1 | 0 |

For example, JCN 63 has a corresponding relation to SCN No. 3 in LSG No. 15 and JCN 48 has a corresponding relation to SCN No. 2 in LSG No. 8.

Let us now explain the corresponding relation of the terminal number of SCN0 . . . SCN3 to the terminal number of JCN0 . . . JCN63.

The wires emerging from those terminals of FCN0 . . . FCN3 which correspond to the levels 4 . . . 7 of FSW 0 to 7 are subjected to a slip. In actual practice, the terminals of JCN which correspond to the levels of FSW do not coincide with the terminal number of SCN, and the following relation exists therebetween.

Terminal number of JCN = | terminal No. of SCR + No. of slips | mod 6     (8)

Each wire extending from the outlet number of SCN to the inlet number of JCN undergoes a different slip. The slip number corresponding to JCN is shown in Table 2. When the connectors are reconnected between SCN and JCN to effect a switching from the degenerative type 6-stage switching network to the 8-stage switching network, a terminal displacement resulting from such slip should be modified in the connector-equipped cable with LJSG short-circuited, while taking the slip into consideration. FIG. 34(A) to FIG. 34(D) show the connection relation between the terminals at the SCN side and the terminals at the JCN side, as well as the position of the connector-equipped cable, when slips 1, 5, 9 and 13 are applied in this order.

Suppose, for example, that with the 6-stage arrangement shown in FIG. 32 the connector-equipped cable is connected between SCN in LSG8 and JCN' in JGF. When in this case the slip number is "0" as shown in T201 in Table 2, it is only necessary that the cable be connected between both the terminals having the same number, one terminal being at the SCN side and the other terminal being at the JCN' side. In this case, the JCN number is 48 and when a switch is effected from the 6-stage arrangement to the 8-stage arrangement the cable is reconnected on JCN' using a patch code 3206 from JCN48. At the same time, SCN2 in LSG8 is reconnected through a connector 3207 connected to TSW. A disconnected cable 3208 is replaced in a path of LJSG fixedly closed by the above-mentioned reconnection. Before replacement, a path for 16 pairs in the cable 3208 is established by a known mechanism. After the replacement, but before the path is closed a path test should of course be made in LJSG.

A switch from the degenerative type 4-stage switching network to the degenerative type 6-stage switching network will now be explained.

In FIG. 31 the TJSG 3106 is provided and a reconnection is made from the cable 3107 to the cable 3108. At this time, lines to SCN' in TSG are so grouped, like LLN, for each connector according to the rule in FIG. 33 that an SCN' plane bears a mapped relation to an FCN' plane. However, the cable 3107 should be adjusted taking into consideration a slip at the LLN side and a possible slip at the TLN side. According to the rule of the junctor wiring as set out above, the junctor sub-groups are all subjected to a slip at either side of LLN and TLN. When a slip occurring at the TLN side is viewed from the LLN side, the slip number at the TLN side constitutes a complement of 16 with respect to the slip number at the TLN side. That is, the slip number 1, 5, 9, 13 at the LLN side correspond to the slip number 15, 11, 7, 3 at the TLN side. For the degenerative type 4-stage switching network the slip number of the cable 3107 is such that the LSG numbers 4, 5, 6, 7, 12, 13, 14 and 15 have the same relation as shown in FIGS. 34(A) to 34(D). The other LSG numbers has a relation as shown in the following Table 3.

Table 3

| LSG | SCN 0 | 1 | 2 | 3 |
|---|---|---|---|---|
| 11 | 7 | 3 | 15 | 11 |
| 10 | 7 | 3 | 15 | 11 |
| 9 | 11 | 7 | 3 | 15 |
| 8 | 11 | 7 | 3 | 15 |
| 3 | 7 | 3 | 15 | 11 |
| 2 | 7 | 3 | 15 | 11 |
| 1 | 11 | 7 | 3 | 15 |
| 0 | 11 | 7 | 3 | 15 |

If a terminal connection is made taking the slip number at the LLN and TLN sides into consideration, an increment to the 6-stage switching network can be made as in the case of a switch from the 6-stage to the 8-stage switching network.

The structural features of the above-mentioned space division type switching network can be summarized as follows:

(1) it has a path structure of a switching network of smaller number of stages which bears a degenerated relation to that of a switching network of larger number of stages.

(2) it has a switch structure capable of beforehand closing a switch of incremented stage in a fixed manner, before wire reconnection, when the switching network is incremented from one stage to another.

(3) it has a connector structure by which JCN and SCN have the same pattern when a stage degeneration is involved.

(4) it has a connector-equipped cable structure for LJSG, LJSG or TJSG short-circuiting.

Like the above-mentioned space division switching network, this invention can be equally applied to a time division switching network as will be explained below.

Figure 34A:
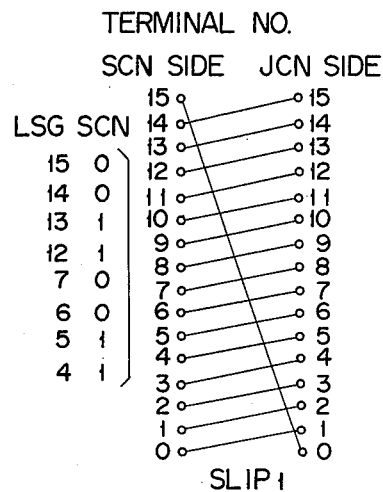
FIGS. 34(A) to 34(E) are views showing a connection of confronting connectors when a different slip is involved.
Figure 34B:
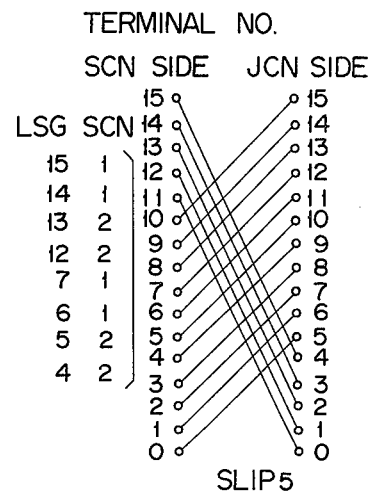
Figure 34C:
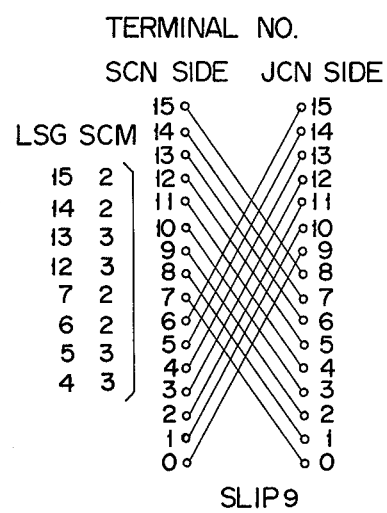
Figure 34D:
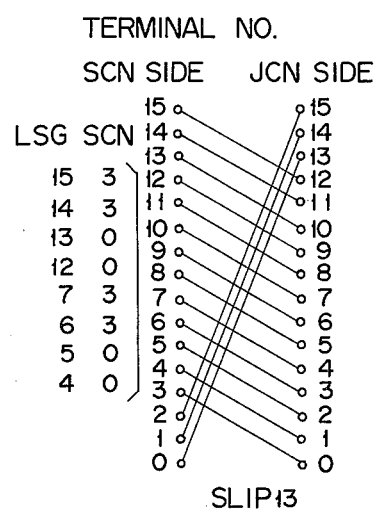
Figures 34E, 35:
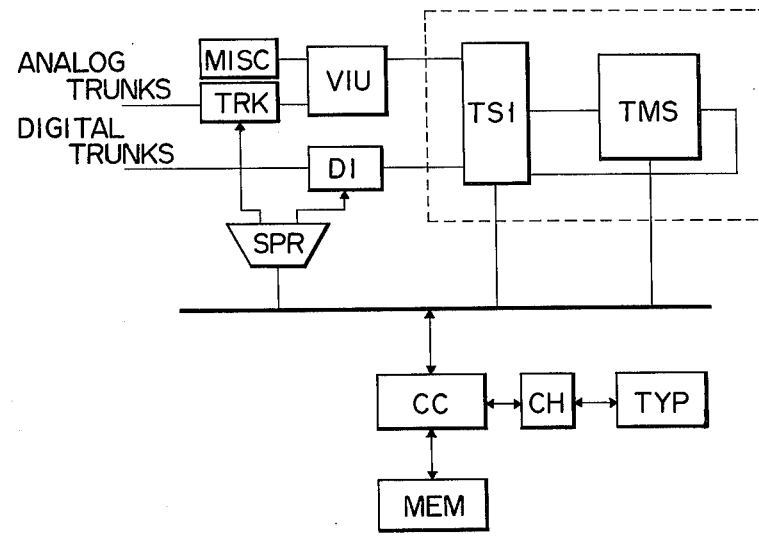
FIG. 35 is a diagrammatic, systematic view showing a time division exchange system.

An electronic switching system to which is applied a digitally operated time division switching network is already known in U.S.A. No.4 ESS etc. (see Bell Laboratories Record: September 1973, p226). FIG. 35 is a diagrammatic, systematic view showing a time division switching system. As shown in FIG. 35 analog trunks are connected through a trunk circuit TRK to a voice interface unit (VIU). VIU has the function of encoding an analog signal on the trunk into a digital signal or decoding the digital signal and of multiplexing and demultiplexing the trunks on a high way having 128 channels. Digital trunks are connected directly to a Di-group terminal D1. D1 has the function of multiplexing and demultiplexing the digital trunks. For example, a T1 system is adapted to 120 of 128 channels of the high way with the 120 channels corresponding to 5 systems. The time division switching network as indicated by dotted lines comprises a time slot interchange TS1 and a time multiplexed switch TMS. A signal processor SPR has the function of extracting a signal from the trunk and detecting its variation and of deliver the signal to the trunk. A central control device CC, channel CH, typewriter TYD, memory etc. are the same as shown in FIG. 1.

The switching principle of a switch structure in the time division switching network will be explained by referring to FIGS. 36 et. seq.

Figure 37:
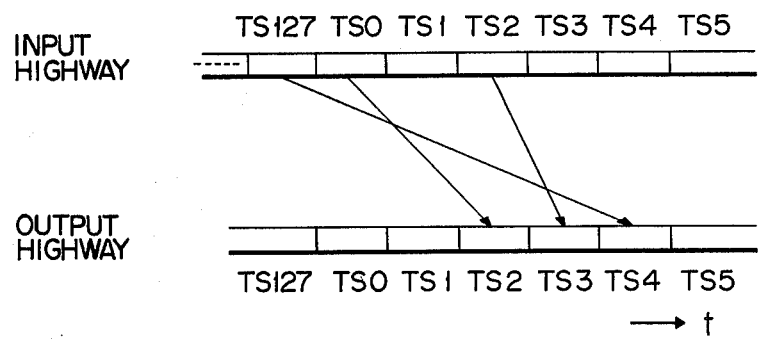
FIG. 37 is an explanatory view showing the switching of time slots in the switching structure.

An input highway 3601 has 128 channels multiplexed. One time slot per channel is delivered on the channel and a total of 128 time slots are supplied through a logic circuit 3603 (AND circuits 0, 1, 2, ... 127) to the memory switch MS 3602. The time slot appears at the rate of 8000/sec on the high way and with 125µs as one frame 128 time slots exists in one frame. Each time slot is constituted of 8-bit PCM code. The memory switch MS 3602 is constructed of 128 cells of 8-bit configuration. A counter 3604 generates a signal corresponding to a number which is in synchronism with a time slot number on the input highway. After being decoded at a decoder 3605 the signal is supplied as a gate input to the logic circuit 3603. As a result, a time slot 0 on the inlet highway is stored in an address in the cell number 0 in MS 3602, ..., and a time slot 127 is stored in an address in the cell number 127. In this way, each cell data is updated at intervals of 125µs. A time slot data read out of MS 3602 is fed through a logic circuit (AND circuits 0, 1, 2 ... 127) to an output highway 3607. A data in a time slot memory TSM 3604 is delivered through a decoder 3608 to one gate of each of AND circuits (0, 1, 2 ... 127), thereby effecting an output control. TSM 3609 is of a cyclic memory and is, like MS 3602, constructed of 128 cells. The content in TSM 3609 is circulated in synchronism with the time at which the time slot from the input highway is delivered. A data in TSM 3609 is delivered as an output for every 125µs, designating a readout cell in MS. Suppose, for example, that data 0, 2 and 127 are stored in the cells TS2, TS3 and TS4, respectively, in TSM 3609. If in this case TSM 3609 is rotated for input control to the AND gates at the output side, TSO in the input highway is converted to TS2 on the output highway; TS2, to TS3; and TS127, to TS4 (see FIG. 37).

Figure 36:
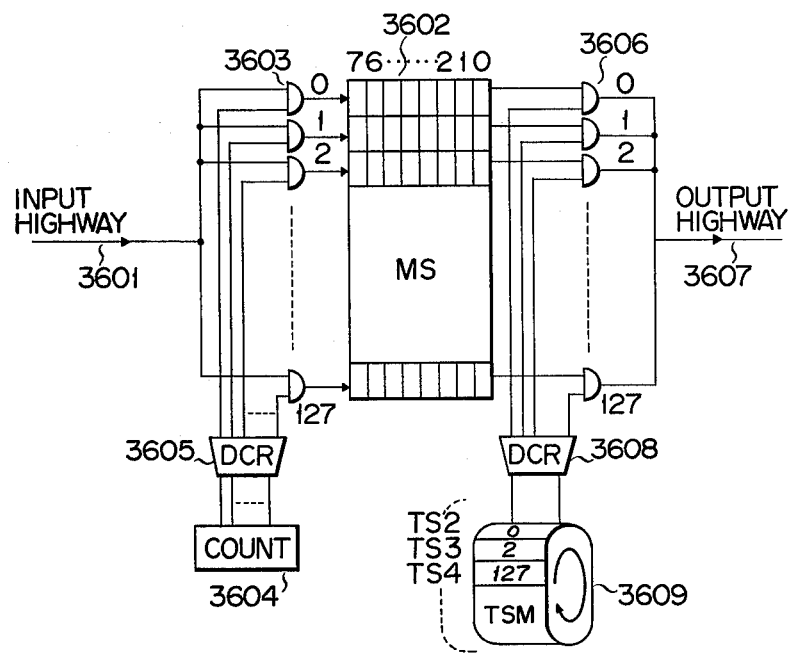
FIG. 36 is a schematic view showing a switching structure as used in the time division switching network.
Figure 39:
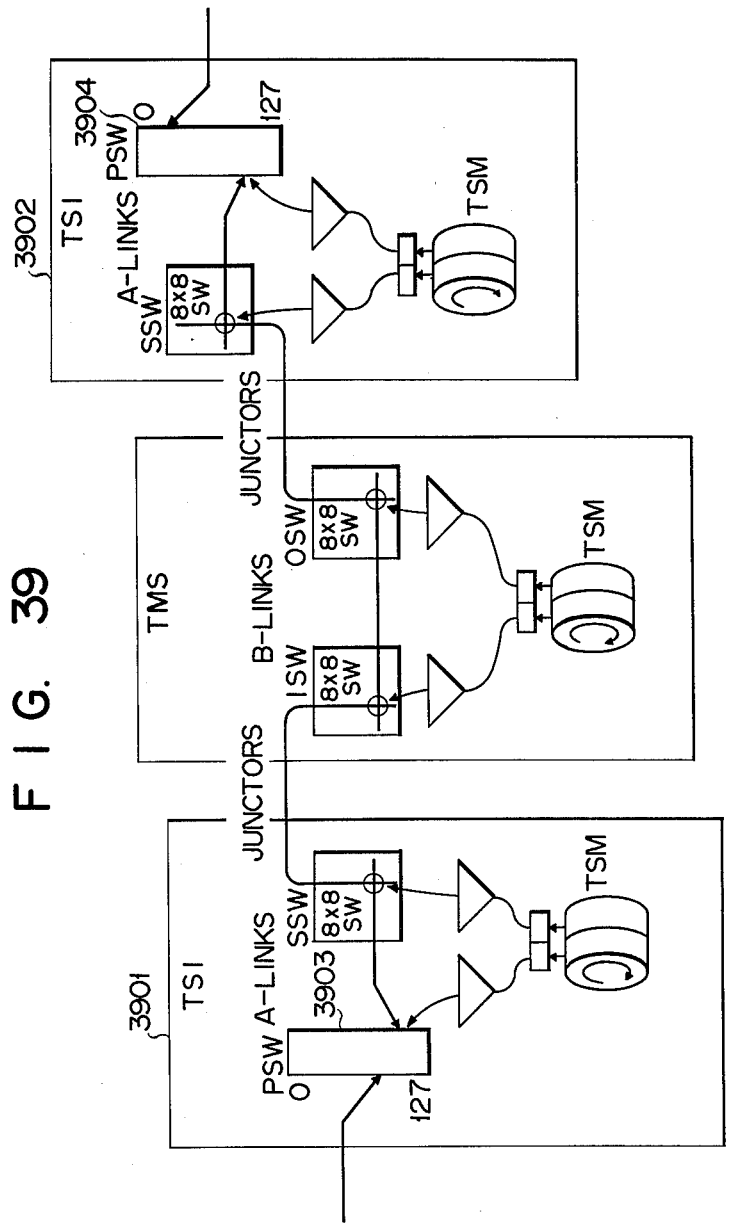
FIG. 39 is a view showing a 6-stage switching network in which two different types of switching structures (FIGS. 36 and 38) are employed.

FIG. 38 shows a switch, different in switching mechanism from the shown in FIG. 36, which is used when a time slot data is delivered from input highways to output highways. The switch shown in FIG. 38 is of a 8 × 8 type. AND gates 3801, 3802 ... are switch-connected between the input highways and the output highways. The gate terminals of the AND gates 3801, 3802 ... are connected time slot memories TSM0, TSM1, ... TSM7 respectively through decoders 0, 1, ... 7 corresponding to the respective output highways. Suppose that a data "1" is stored in TS3 in TSM0, a data "0" in TS3 in TSM1 and a data "7" in TS3 in TSM7. Then, at time of TS3 AND gates 3802, 3803 and 3804 are closed. FIG. 39 shows a 6-stage switching network in which two different switches are combined. As a PSW 3903 and 3904 of time slot interchanges LSI's 3901 and 3902, respectively, use is made of a memory switch as explained in connection with FIG. 36. As the other switch structure use is made of a time division type switch as explained in connection with FIG. 38.

Viewed from the path structure, the time division switching network using such switches is equivalent to the space division switching network, as will be explained later.

Figure 40:
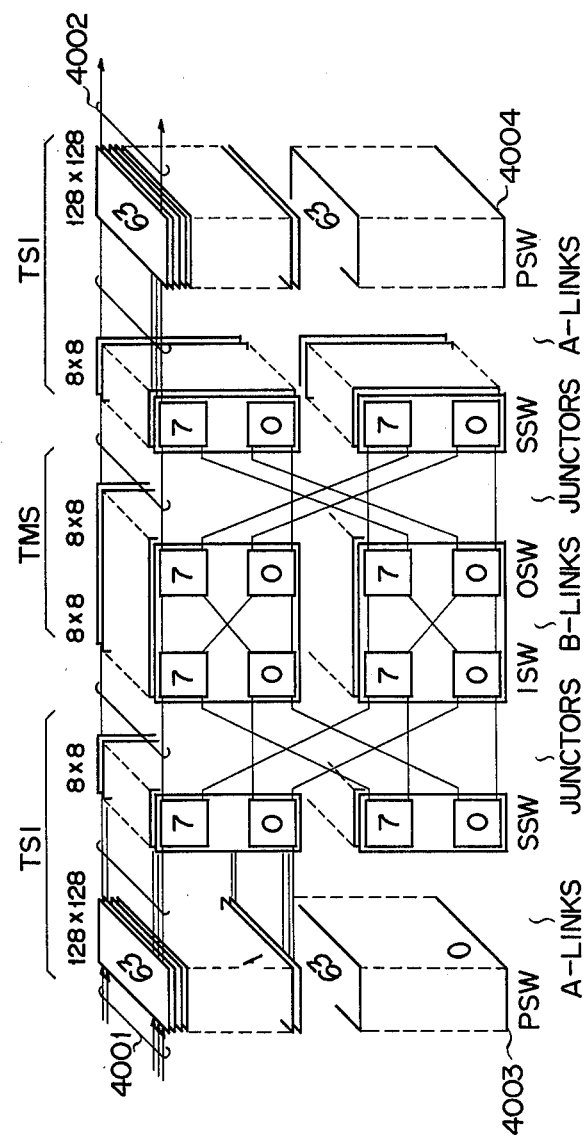
FIG. 40 shows an equivalent path structure of a time division switching network.

FIG. 40 shows an equivalent path structure of the time division switching network. An input line group 4001 and output line group 4002 in TSI have 128 channels, respectively, in one highway. PSW's 4003 and 4004 of both TSI's provided for time slot replacement are equivalent to a time division switch having a 128 × 128 structure. Switches SSW, LSW, OSW and SSW in the remaining stages are operated as a 8 × 8 switch which is independent for each time slot. In consequence, the intermediate 4-stage switching network is equivalent to a structure formed by superposing grid plates one upon another which is equal in number to the time slots. The faces of the grid plates are selected between PSW at one end and PSW at the other end of the intermediate 4-stage switching network.

As mentioned above, the time division switching network can be expressed as being equivalent to a 6-stage time division switching network as shown in FIG. 40. If, therefore, the above-mentioned intermediate stage arrangement is constructed as a virtual switch structure, a switching network of upper size can be degenerated to a switching network of lower size.

Referring to FIG. 41, a small capacity switching network in which the time multiplexed switch is embodied in a virtual form will now be explained.

In the switching network shown in FIG. 41 each line shows one coaxial cable and 128 channels are received in a depth direction shown in FIG. 40. Corresponding 128 switches are also provided in a depth direction. The switching network in FIG. 41 is used for a small office equipped with NWO only. In such a small office TMS is degenerated. In this case, let us assume that each cross point at each of switches having an equal number of inlet and outlet terminals is fixedly close over all the time slot. Then, the outlet terminals of SSW in TSI 4101 bears a mapped relation to the outlet terminals of the corresponding OSW in TMS. In consequence, TSI 4101 can be directly connected to TSI 4102 by the use of coaxial cables 4103 and 4104. A 4-stage switching network can be constructed using PSW and SSW in TSI. It is to be noted, however, that the coaxial cables 4103 and 4104 should be adjusted to have a length which permits a delay time equivalent to that as involved when TMS is inserted. In the case where a switch is made from the degenerative type 4-stage switching network to the 6-stage switching network, TMS is incorporated and, after each cross point is closed according to the above-mentioned rule, the switch control circuit is driven. Then, the coaxial cable 4103 for short-circuiting is replaced by the coaxial cables 4105 and 4106 constituting a TMS path. Even in the time division switching network, a path selection additional mechanism, imitation circuit for a switch control section, and a group structure (used as a wire replacement unit on stage growth installation), i.e., a coaxial cable receiving mode, as used in the assembly of the degenerative type switching network may be easily surmised from the space division switching network and further explanation will be omitted.

With the time division switching network, a means for fixedly closing an increment stage switch during a stage growth installment corresponds to a means for writing a fixed data in TSM in FIG. 39. For this reason, the fixed closure of switches cannot be achieved, unlike the space division switching network, without any additional means. However, the time division switching network commonly employs a spare means for double assurance and there is adopted a means for writing an additional program in TSM after switched at the spare system side. It is therefore possible to provide a suitable switch closing means corresponding to the above-mentioned additional means.

There will now be explained a case where a simultaneous remote control is effected by means of a single control mechanism over a plurality of switching networks of different stages at the offices of varying size.

In a remote control system of a switching system, a large-capacity processor is located at the central office and a plurality of centrals or exchanges are scattered around the central office and collectively controlled by the processor through a control data path. Under these situations a terminal office has usually a different size. In consequence, a great significance is given, from the standpoint of the extension of service area, to the simultaneous remote control by a single control mechanism of a plurality of offices having switching networks of different stages. This object can be attained by the same application mode as involved when the degenerative type switching network is controlled by such a control mechanism. A remote control system for a switching system is already known in the art and is embodied by a remote control means and a multi-office common control means.

Figure 42:
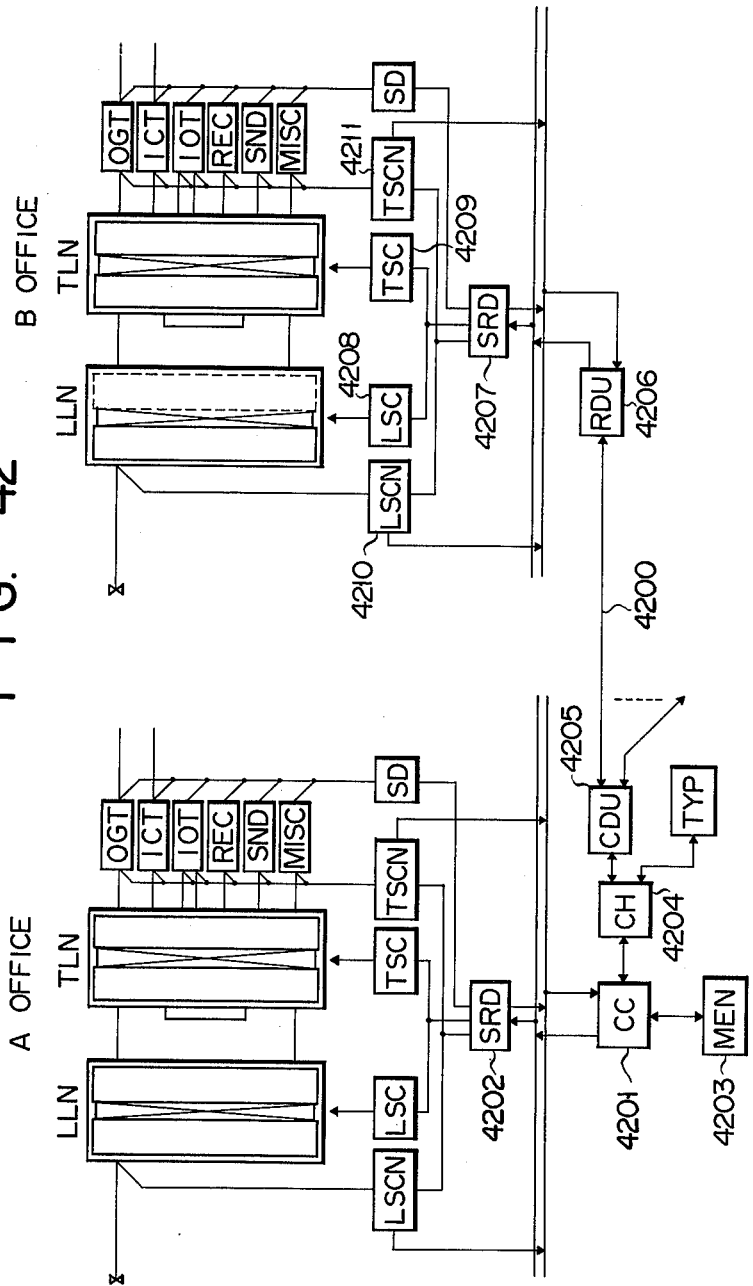
FIG. 42 is a systematic view showing a remote control and a common control over a plurality of centrals or exchanges.

FIG. 42 shows one example in which a B office (central) remote from an A office is remotely controlled, through a control data transmission path 4200, by the same control mechanism mainly comprising CC 4201. A control order is supplied, by CC4201, through a signal receive/distribute device SRD 4202 to the switching network of the A office. When, on the other hand, the B remote office is remotely controlled, CC 4201 permits a control order to be buffered in MEM 4203 instead of delivering the order directly to SRD 4202. The buffered control order is transferred, by a channel command issued by CC 4201 for a predetermined time period (for example, 8 ms), to a transmission control device RDU 4202 (to the remote office) through channel CH 4204, transmission control device (to the central) and a transmission path 4204. With respect to the B office, RDU 4206 transfers a control order, on behalf of CC 4201, to a switch control device 4208 through SRD 4207 to cause any one switch in LLN to be closed. The result is returned over the transmission path to MEM 4203. To permit a data readout at LSCN 4210 etc. an image area is provided in MEM 4203. All the area read out by a channel command issued for a predetermined time period (for example, 8 ms) from CC 4201 is transferred, as a signal through the transmission path 4200 and CDU 4205 to the image area of MEM 4203 where it is duplicated. An exchange program reads out the image area in MEM 4203, on behalf of LSCN in the B office, to execute a call processing.

The control of a plurality of offices by a single common mechanism will be explained below.

A common control function is performed by a time division office-to-office switching control at the single CC 4201 and by the use of a common control program in MEM 4203 and a common data prepared for each office. That is, at a certain time CC 4201 delivers a control signal to the A office on the basis of an A office control data in MEM 4203 and, after the lapse of this time, a control signal to the B office on the basis of a B office control data. A combination of the degenerative type switching network with the remote control mechanism (FIG. 42) permits a remote control over a plurality of offices even when switching networks of different stages are used in the office. This remote control is effected by the following features:

(1) Taking into consideration the check output imitating mechanism for the switch control device, the grid plate structure adapted to receive wires as a cable rewiring unit, the connector-equipped cable structure having a built-in slip, and so on, the corresponding arrangement is adopted for a plurality of offices.

(2) To restrict the selection range of the path structure by the application of a virtual switch structure, data such as "LNK" shown in FIG. 16, "STAGE No." shown in FIG. 22, "MASK PTN" shown in FIG. 23 are used for each office according to the state of the office.

(3) The additional portion, such as 2202 and 2203 (FIG. 22) and 2301 (FIG. 23), of a control program for varying the selection range for each office by reference to data, is arranged in the common section of the control mechanism.

If a degenerative type switching network is constructed by using the already known remote control system, a new switching system having a wide application range can be provided.

The characterizing features of this invention can be now summarized as follows:

(1) Even when in the multi-stage switching networks different stages are used according to the switching system size required by the application range of telephone traffic, a specified switching network of upper size can be used as a fundamental unit to provide a switching network of lower size by inserting a virtual switch structure into a specified intermediate stage. In this case, the switching network of lower size provides a partial path structure with respect to the switching network of upper size.

(2) The path selection control of the switching network of lower size is effected by an additional control mechanism for restricting a path selection range according to the stage to which the virtual switching structure is applied. There is provided a mechanism adapted to suppress a control order to a virtual switch within a switch control device and to imitate a check output. The provision of such a mechanism permits the switching network of different stages to be coordinately controlled by the same control device.

(3) A switch structure for closing a cross point in each switch in a fixed manner, a grid structure adapted to receive a connector for a wire replacement unit and a connector-equipped grid structure having a built-in slip are adopted to realize the virtual switch structure. This permits the switching network in operation to be incremented to a higher stage on the basis of a building block structure without service interruption.

(4) A combination of the degenerative type switching network with a remote control means and an office common control means permits a plurality of switching networks of different stages to be simultaneously controlled by the single common control means and one control program.

What we claim is:

1. A multi-stage switching network in a telecommunication switching system having a path selection system which is independent of the switching network, comprising a degenerative type switching network including:

a virtual link frame comprised of a plurality of virtual switches, means for inserting said link frame into any specified intermediate stage of said multi-stage switching network according to the switching system size required by the application range of telephone traffic, said virtual switches being normally closed and being arranged to form fixed crosspoints, whereby the stage size of real switches in said multi-stage switching network can be incremented according to the application range.

2. A multi-stage switching network according to claim 1, further comprising a busy/idle recording map, and in which said virtual link frame of said degenerative type switching network comprises a path selection control means which effects a path selection control, said path selection control means including:

an additional control mechanism for restricting, through masking based on said busy/idle recording map, a path selection range according to the stage to which the virtual switches of said link frame are applied, and a mechanism for imitating a check output which is controlled by a control order to said virtual switches.

3. A multi-stage switching network according to claim 2 in which said path selection control means further includes a remote control means for operating same and an office common control means for operating same.

* * * * *